United States Patent
Emerson

(10) Patent No.: US 7,126,607 B2
(45) Date of Patent: Oct. 24, 2006

(54) ELECTRONIC GAME AND METHOD FOR EFFECTING GAME FEATURES

(75) Inventor: Andre Emerson, Belmont, CA (US)

(73) Assignee: Namco Bandai Games, Inc., Tokyo (JP)

(*) Notice: Subject to any disclaimer, the term of this patent is extended or adjusted under 35 U.S.C. 154(b) by 430 days.

(21) Appl. No.: 10/223,906

(22) Filed: Aug. 20, 2002

(65) Prior Publication Data

US 2004/0046800 A1 Mar. 11, 2004

(51) Int. Cl.
*G06T 13/00* (2006.01)

(52) U.S. Cl. .......................... 345/474; 345/473; 463/36; 463/46; 715/810

(58) Field of Classification Search ................ 345/473, 345/476, 474; 463/43, 51, 23, 31, 4, 36, 463/46; 715/810
See application file for complete search history.

(56) References Cited

U.S. PATENT DOCUMENTS

| 6,149,523 | A | 11/2000 | Yamada et al. |
| 6,155,924 | A * | 12/2000 | Nakagawa et al. ............ 463/4 |
| 6,217,449 | B1 | 4/2001 | Kaku |
| 6,256,040 | B1 | 7/2001 | Tanaka et al. |
| 6,256,047 | B1 * | 7/2001 | Isobe et al. ................. 345/473 |
| 6,267,676 | B1 | 7/2001 | Nagaoka |
| 6,304,267 | B1 | 10/2001 | Sata |
| 6,323,895 | B1 | 11/2001 | Sata |
| 6,388,667 | B1 | 5/2002 | Sato et al. |
| 6,417,856 | B1 | 7/2002 | Tamura et al. |
| 6,425,826 | B1 | 7/2002 | Nakanishi et al. |
| 6,589,120 | B1 * | 7/2003 | Takahashi ..................... 463/51 |
| 6,699,127 | B1 * | 3/2004 | Lobb et al. .................... 463/43 |

* cited by examiner

*Primary Examiner*—Kimbinh T. Nguyen
(74) *Attorney, Agent, or Firm*—Welsh & Katz, Ltd.

(57) ABSTRACT

The system and method effects character interplay in a computer game having a primary character and at least one opposing character. An embodiment of the method has the steps of: identifying a relationship between the primary character and the at least one opposing character; selecting at least one feature for the primary character based on the identified relationship; executing the at least one feature such that the primary character in a first phase at least targets the at least one opposing character, in a second phase at least interfaces with the at least one opposing character, in a third phase performs the least one action relative to the at least one opposing character, and in a fourth phase at least removes the at least one opposing character from contention.

29 Claims, 19 Drawing Sheets

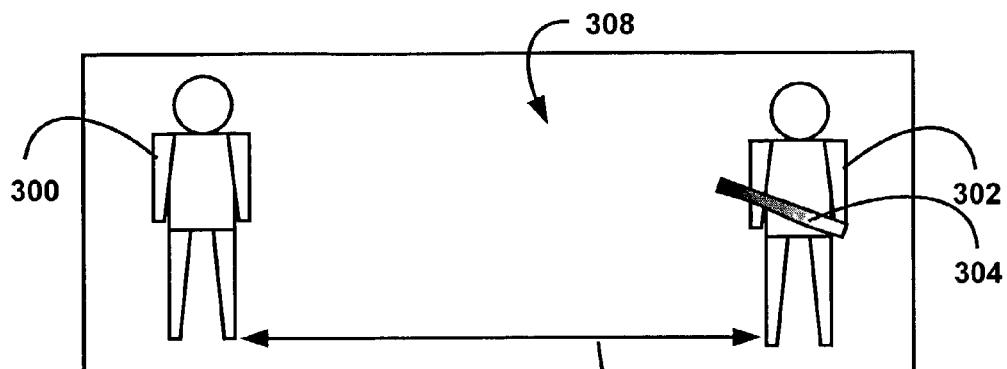
FIG. 3A
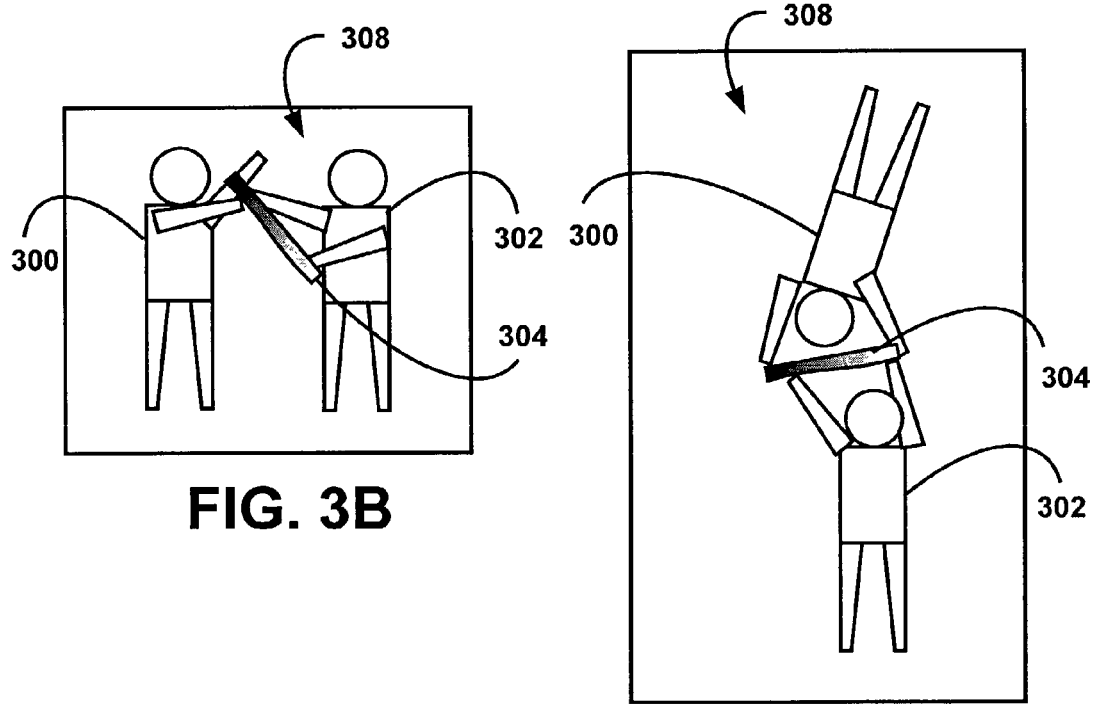
FIG. 3B
FIG. 3C
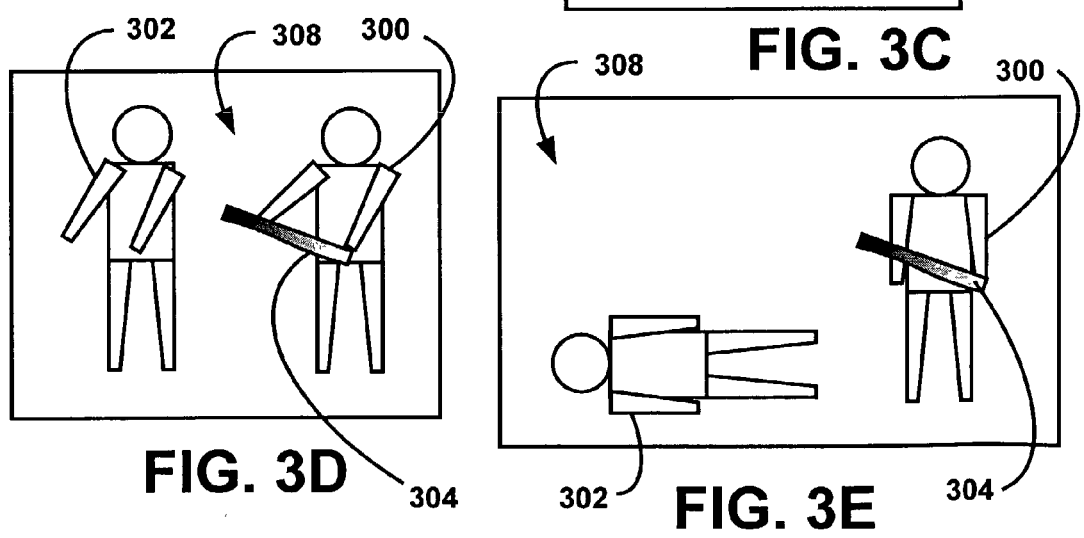
FIG. 3D
FIG. 3E computer program code
for controlling the movements
of the at least one primary character and
at least one opposing character
1400 a first computer program code segment that
provides at least one special game item
1402 a second computer program code segment that
identifies a relationship between the primary
character and the at least one opposing
character, and one of previously, concurrently,
and subsequently to the relationship
identification obtaining the special game item
1404 a third computer program code segment that
effects transferring the special game item from
the primary character to a region of the at least
one opposing character
1406 a fourth computer program code segment that
effects targeting the special game item by the
primary character
1408 a fifth computer program code segment that
effects activating the special game item to
thereby remove the at least one opposing
character from contention
1410

FIG. 14

**computer program code
for controlling the movements of
at least one primary character and at least one opposing character
1500** a first computer program code segment that identifies a relationship between the primary character and the at least one opposing character
1502 a second computer program code segment that effects taking control of the at least one opposing character by the primary character
1504 a third computer program code segment that effects using the at least one opposing character by the primary character for a selected action
1506 a fourth computer program code segment that effects removing from contention the at least one opposing character using the primary character
1508

FIG. 15 computer program code
for controlling the movements of
at least one primary character and at least one opposing character
1600 a first computer program code segment that provides a special character associated with the primary character
1602 a second computer program code segment that identifies a relationship between the primary character and the at least one opposing character
1604 a third computer program code segment that selectes the special character
1606 a fourth computer program code segment that references the special character to the at least one opposing character
1608 a fifth computer program code segment that effects moving the special character from the primary character to the at least one opposing character
1610 a sixth computer program code segment that effects removing from contention the at least one opposing character using the special character
1612 a seventh computer program code segment that effects transferring the game item from the at least one opposing character to the primary character using the special character
1614

FIG. 16 computer program code
for controlling the movements of
at least one primary character and at least one opposing character
1700 a first computer program code segment that provides a plurality of
predetermined scenarios
1702 a second computer program code segment that identifies a relationship
between the primary character and the at least one opposing character
1704 a third computer program code segment that selectes one scenario of the
plurality of predetermined scenarios
1706 a fourth computer program code segment that effects contacting the game
item of the at least one opposing character by the primary character
according to the selected scenario
1708 a fifth computer program code segment that effects transferring the game
item from the at least one opposing character to the primary character
according to the selected scenario
1710 a sixth computer program code segment that effects removing from
contention the at least one opposing character using the game item
according to the selected scenario
1712

FIG. 17

ELECTRONIC GAME AND METHOD FOR EFFECTING GAME FEATURES

CROSS REFERENCE TO RELATED PATENTS AND APPLICATIONS

The present application is related to U.S. Pat. Nos. 6,388,667, 6,417,856, 6,304,267 and 6,256,040, all of which are hereby incorporated by reference.

FIELD OF THE INVENTION

The present invention relates to a computer game apparatus for executing a game in which characters displayed on a predetermined display are operated by a predetermined operating unit.

BACKGROUND

There are many types of video games on the market. One of these pits a primary character operated by a player against an opposing character controlled by the computer so as to fight each other on the display screen. In such a fighting type video game, the attack may be launched not only against the opposing character, but against walls and other simple objects. Thus, the opponent character may be a character or object controlled by the computer or operated by another player when viewed from one player's side. It may also be a character or object operated by the player when viewed from the computer side.

Shooting games, in which the entertainment value involves shooting at an enemy or target, are known in the prior art. A number of variations have been introduced, from those types of games which involve simple shooting against a target to those which set in opposition a primary character moving about the game space (also referred to as virtual space) and an opposing character or characters.

Conventionally, with a computer game apparatus a player views images displayed on a display while using a lever, buttons, joystick, etc. to operate a primary character fighter which competes, within the virtual space of the game, against an opposing character fighter of the game. In this type of game, when the two fighting characters, which are equipped with weapons, located within the virtual space of the game are at a distance from each other, a shoot-out may take place using weapons. Alternatively, when the two characters are at close proximity, they may fight each other in physical combat. Known computer games of this type also may include puzzle solving (see U.S. Pat. No. 6,256,040).

As a number of diverse shooting games are in existence, how to set apart a shooting game becomes an important issue. Thus, there is a need for a computer or video game that immerses the player into the storyline and characters similar to the way movies do. There is also a need for a different type of action-adventure genre with new and more exciting features.

BRIEF DESCRIPTION OF THE DRAWINGS

The features of the present invention which are believed to be novel are set forth with particularity in the appended claims. The invention may best be understood by reference to the following description taken in conjunction with the accompanying drawings, in the several figures of which like reference numerals identify like elements, and in which:

FIGS. 3A–3E depict image stages of sequence of actions in an embodiment of the game system;

FIG. 14 is a block diagram of computer program code for controlling the movements of the at least one primary character and at least one opposing character for a feature embodiment according to the game program;

FIG. 15 is a block diagram of computer program code for controlling the movements of the at least one primary character and at least one opposing character for another feature embodiment according to the game program;

FIG. 16 is a block diagram of computer program code for controlling the movements of the at least one primary character and at least one opposing character for yet another feature embodiment according to the game program; and FIG. 17 is a block diagram of computer program code for controlling the movements of the at least one primary character and at least one opposing character for a further feature embodiment according to the game program.

DETAILED DESCRIPTION

Figure 1:
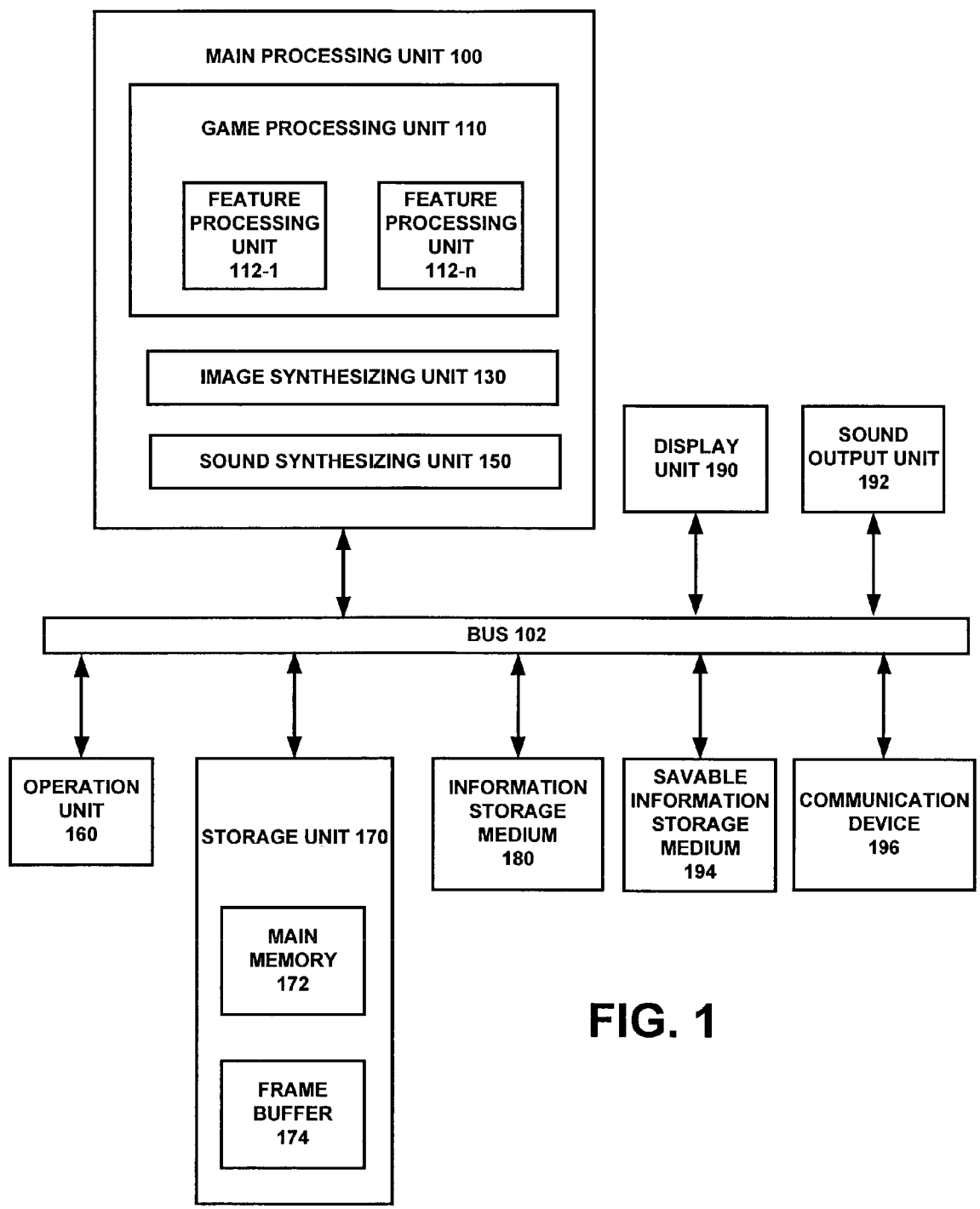
FIG. 1 is a general block diagram of an embodiment of the game system.

While the present invention is susceptible of embodiments of various forms, they are shown in the drawings, and will hereinafter be described, some exemplary and non-limiting embodiments, with the understanding that the present disclosure is to be considered an exemplification of the invention. It is not intended to limit the invention to the specific embodiments illustrated.

A functional block diagram of one embodiment of the game system is depicted in FIG. 1. The main processing unit 100 may be commonly used in the embodiments of the game system, while the system with regard to the other blocks may be configured differently.

The main processing unit 100 controls the running of the system generally; executing intra-system commands and processing games, images and sound. Its function may be implemented by various processors (for example, CPU or DSP), hardware such as ASIC (gate array, for example), and a given program (a game program). The operation unit 160 assists the player in entering operational data. Its function may be implemented through input devices such as levers, buttons or mouse controllers.

The storage unit 170 is the workspace of the main processor 100 and the communication device 196. It has the main memory 172 and the frame buffer 174 (further divided into a first frame buffer and a second frame buffer). Its function may be implemented through hardware such as RAM.

The information storage medium 180 stores information such as programs and data. This function may be implemented by hardware, such as optical memory disks (CD, DVD), magnet-optical disks (MO), magnetic disks, hard disks, magnetic tapes or memory (ROM), etc. Relying on the information stored in the information storage medium 180, the main processing unit 100 executes the various processes of the embodiments of the game. In short, in the information storage medium 180 may be stored the information (programs and data) necessary to execute the means (especially those represented by the blocks contained within the main processing unit 100) of the embodiments of the game.

When the system is running, a portion or all of the information stored in the information storage medium 180 may be transmitted to the storage unit 170. The information stored in the information storage medium 180 may include at least one of the following; program cards, imaging data, sound data, display configuration data, tables and lists necessary to execute the present invention, or commands for the running of the embodiments of the game or information necessary to execute those commands.

The display unit 190 outputs the images generated by the embodiments of the game. This function is implemented by hardware, such as CRT displays, LCD displays, HMD (head-mounted display), etc. The sound output unit 192 outputs the sound synthesized by the embodiments of the game. This function may implemented by hardware, such as speakers, head phones, etc.

The savable information storage device 194 stores personal data of the player (saved data). Memory cards, portable game units or other devices may be used to implement this function.

The communication device 196 executes all commands to communicate with outside units (for example, the host unit, other game systems, etc.). This function may be implemented by various processors, communication programs, hardware such as ASIC, etc.

It is also possible to have programs or data, which implement and execute embodiments of the game, transferred from a host information storage medium to the information storage medium 180 from a network, for example, via the communication device 196. Such use of the information storage medium of the host (server) is within the scope of the present invention.

In the embodiment depicted in FIG. 1, the main processing unit 100 has a game processing unit 110, an image-synthesizing unit 130 and a sound-synthesizing unit 150. The game processing unit 110 handles various game processes, executed through instructions received from, for example, operational data received from the operation unit 160 and game programs and personal information stored in the savable information storage unit 194. Some of these processes may be as follows for different implementations and environments. The game processing unit 110: processes coin (currency) intake; processes the selection of mode; determines game progression; processes optional display settings; ascertains object (in the most basic sense of one or several) positioning and angle of rotation (relative to a coordinate system); makes objects move (motion processing); ascertains viewpoints (the position of a virtual camera) and angle of view (the angle of rotation of the virtual camera); maps objects within an object space or virtual space; processes collision detection; calculates game results (outcome, score); enables a number of players to play in the same game space; and determines when the game is over.

The image-synthesizing unit 130 follows instructions such as those received from the game processing unit 110 to execute various image processes. For example, the image-synthesizing unit 130 may execute a number of geometrical processes (three-dimensional operations), such as changing of coordinates, clipping, changes in perspective, and light source calculation. It may also image geometrically processed objects (models) on the frame buffer, and output to the display unit 190 images synthesized as if viewed in the object space from a virtual camera (viewpoint). The image-synthesizing unit 130 may also execute the geometric positioning processes (three-dimensional operations) of changing of coordinates, clipping, changes in perspective, and light source calculation and may also execute the process of imaging the geometrically processed objects (models) on the frame buffer.

The sound-synthesizing unit 150 receives instructions from the game processing unit 110 to execute various sound processes. It synthesizes BGM, effects, and voices, among other sounds, and outputs these to the sound output unit 192.

The functions of the game processing unit 110, the image-synthesizing unit 130 and the sound-synthesizing unit 150 may be implemented through hardware or these may be implemented through a software program. They may also be implemented through a combination of hardware and software.

The game processing unit 110 may have a plurality of feature processing units 112-1, 112-n. A feature processing unit executes, or causes the game processing unit, or other portion of the game system, to execute movement, action and collision detection processing for a special feature of the game. The movement and action processing nay consist, for example, of calculating movement information concerning the characters and objects (positioning data, angle of rotation data) and action information concerning the characters and objects (data concerning the location of various parts of objects, angle rotation data). This processing involve moving objects and making them act, based on game programs or operational data inputted by the player by means of the operation unit 160.

The embodiments of the game system may be tailored to a single-player mode specialization system played by one person alone, or they can be made to accommodate not just one player, but also several players in a multi-player system. In the case of a multi-player system, game images and sounds presented to players may be generated on one terminal, or they may be generated on several terminals connected to a network (transmission line, communication line).

Embodiments of the game system provide for increased game play, player control of characters in the game, and features not found in prior art game systems. In very general terms, an embodiment of the game system in the form of a method is for effecting character interplay in a computer game of the game system. In general terms the method encompasses a primary character and at least one opposing character. The method has the general steps of: identifying a relationship between the primary character and the at least one opposing character; selecting at least one feature for the primary character based on the identified relationship; executing the at least one feature such that the primary character in a first phase at least targets the at least one opposing character, in a second phase at least interfaces with the at least one opposing character, in a third phase performs the least one action relative to the at least one opposing character, and in a fourth phase at least removes the at least one opposing character from contention.

Figure 2:
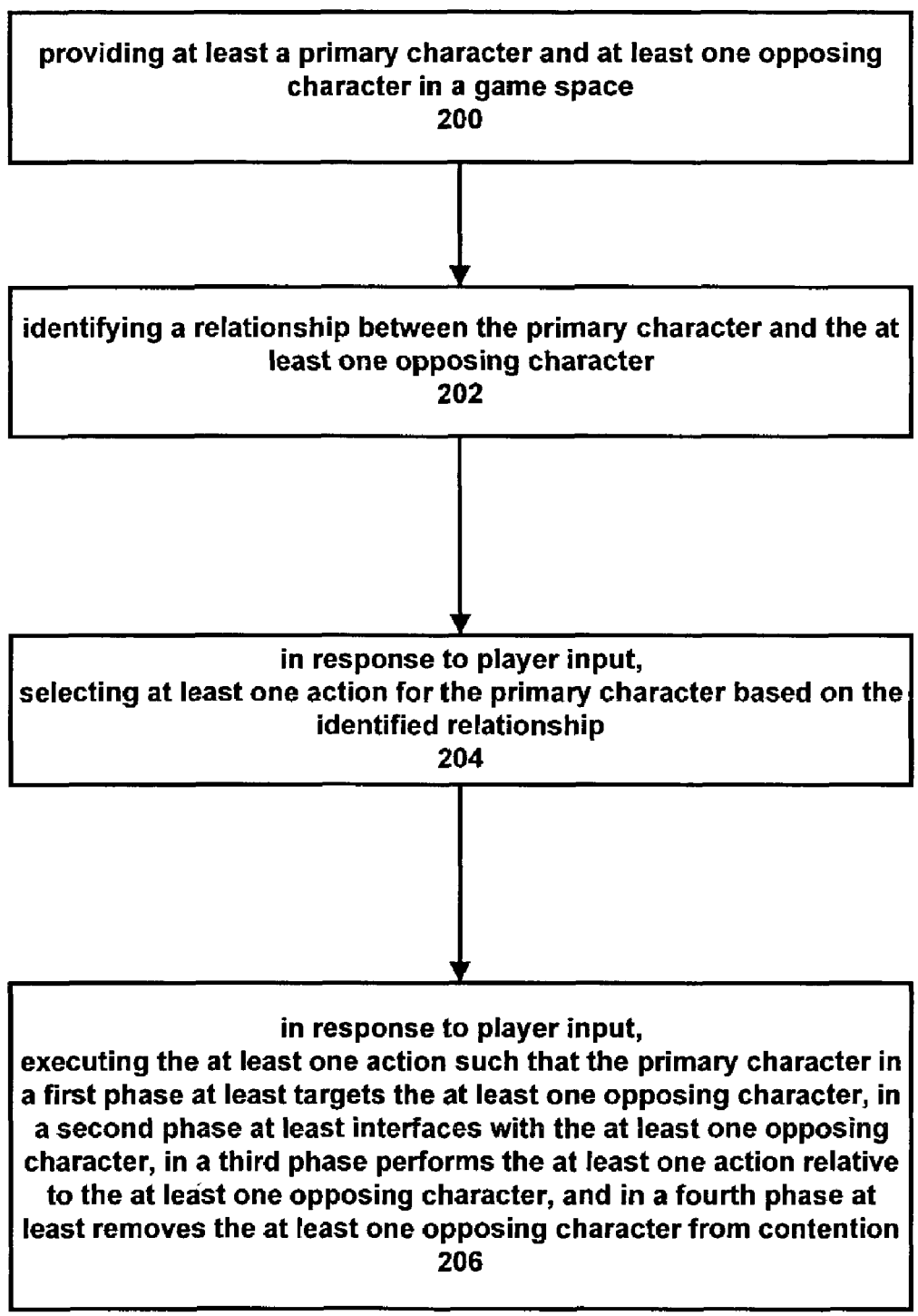
FIG. 2 is a general flow diagram of an embodiment of the game system.

FIG. 2 depicts a general flow chart of the method of an embodiment of the game system. The providing of at least one primary character and at least opposing character in a game space is the first step 200 depicted in FIG. 2. A relationship is then identified between the primary character and the opposing character in step 202. At least one feature is then selected for the primary character based on this identified relationship in step 204. In step 206, the feature is executed such that the primary character in a first phase at least targets the at least one opposing character, in a second phase at least interfaces with the at least one opposing character, in a third phase performs at least one action relative to the at least one opposing character, and in a fourth phase at least removes the at least one opposing character from contention. By different implementations of these four phases, various different selectable features (for example, disarming an opposing character, using another character to fetch an item from the opposing character, using the opposing character as a shield, exploding items in the air in a region of the opposing character, etc.) are provided in the game system. As will be described below, the features of the embodiments of the game system are effected by combinations of player inputs and computer executed scenarios. Depending on the environment of the computer game, the characters may be human, non-human, animal, fantasy, or other entities. The computer game may be a fighting type, puzzle type, etc.

One feature embodiment of the game system is referred as "disarm." This involves a primary character (typically the character which represents a player) and at least one opposing character in a game space. The opposing character may have a game item, for example, a weapon. To disarm the opposing opponent, the primary character should be unarmed (this can be accomplished by "sheathing a current weapon of the primary character"). When the primary character comes within a predetermined range or area of the armed opposing character, one of a plurality of different disarm scenarios is selected by the player and activated by a player input (such as pushing a button on a controller). The disarm scenarios can be automatically selected at random or may be specifically selected by the player.

Figure 4:
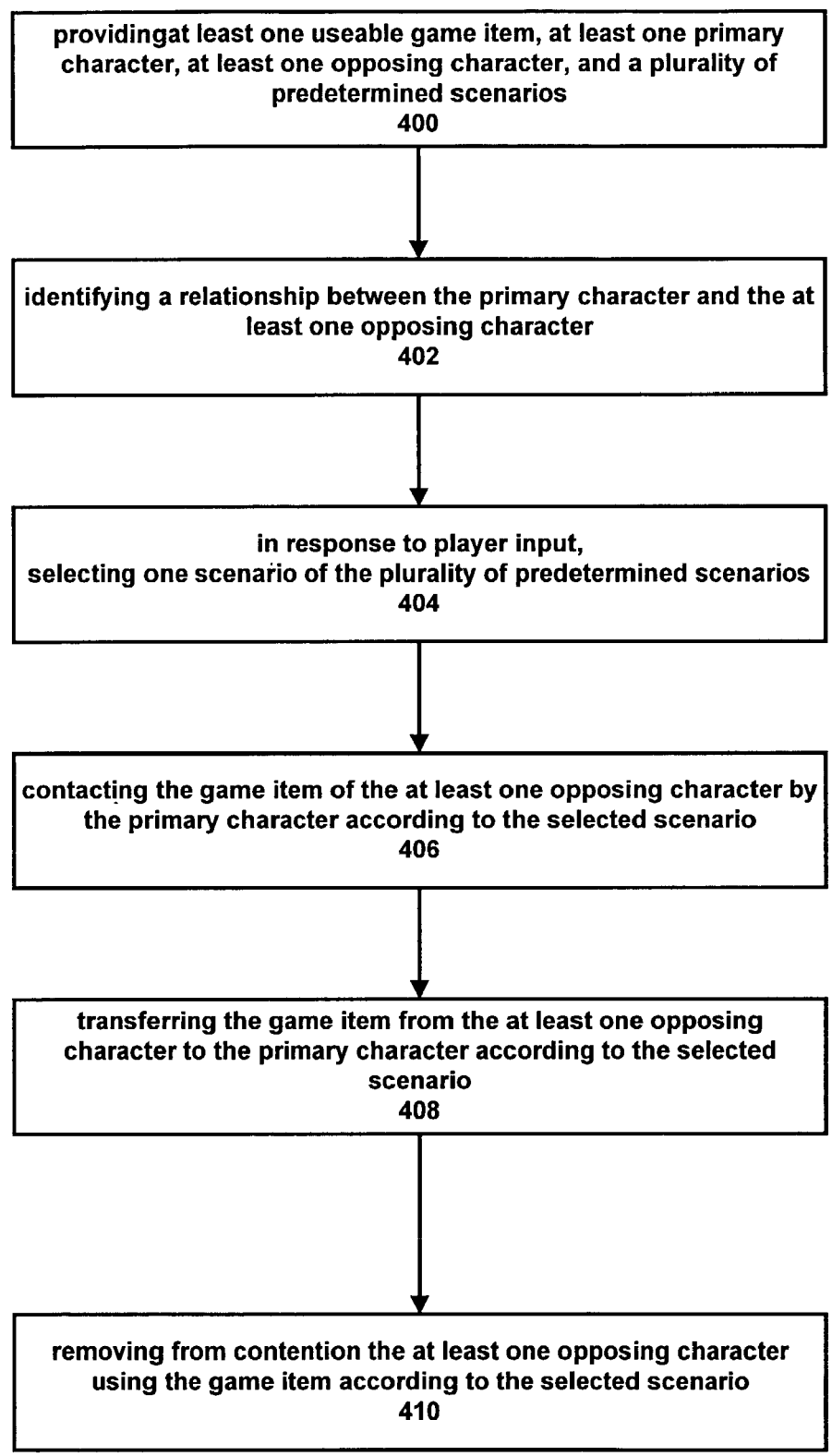
FIG. 4 is a flow diagram of the FIGS. 3A–3E embodiment.

FIGS. 3A–3E are a series of pictures depicting, as an example, one disarm feature embodiment of the game system, and FIG. 4 is a flow chart depicting the method steps for implementing the disarm feature embodiment. FIG. 3A depicts a primary character 300, an opposing character 302 having a special game item 304 (such as a weapon) in a game space or virtual space 308. (Also see step 400 in FIG. 4.) When the primary character 300 is unarmed and comes within a predetermined distance (or area) 306 of the armed opposing character 302 (see FIG. 3), the player can select (via a controller) a disarm scenario from a plurality of disarm scenarios that are available in the game. When the primary character 300 comes within the predetermined distance or area 306 of the opposing character 302, a relationship is thus identified between the primary character 300 and the at least one opposing character 302 (see step 402 depicted in FIG. 4). Selecting one scenario of the plurality of predetermined scenarios is effected in step 404 of FIG. 4.

As shown in FIG. 3B, the primary character 300 moves to the opposing character 302 and contacts the game item (weapon 304) of the opposing character 302 according to the selected disarm scenario. As depicted in FIG. 3C, the primary character 300 performs a maneuver, that is, moves in the game space relative to the opposing character 302 while in contact with the weapon 304. In FIG. 3D, the opposing character 300 has disarmed the opposing character 302 and has taken possession of the weapon 304. In other words, a game item (weapon 304) is transferred from the opposing character 302 to the primary character 300 according to the selected disarm scenario. Step 406 in FIG. 4 is the step of contacting the game item of the opposing character by the primary character, and step 408 in FIG. 4 is the step of transferring the game item from the opposing character to the primary character. Finally, as shown in FIG. 3E, the opposing character 302 is eliminated from contention by the primary character 300, for example, by the use of the weapon 304. It is to be understood, however, that the term "removing from contention" includes not only permanently dispatching the opposing opponent 302, but also may include disabling the opposing character 302 for a predetermined time period, reducing abilities of the opposing character 302 either permanently or for a given time period, rendering inoperative the opposing character 302 in a variety of different manners, changing the status of the opposing character, etc. The removing from contention of the at least one opposing character using the game item according to the selected disarm scenario occurs at step 410 in FIG. 4.

Thus, the disarm feature embodiment of the game system may provide for a plurality of predetermined disarm scenarios, targeting the at least one opposing character by the primary character, selecting one disarm scenario of the plurality of predetermined scenarios, grabbing by the primary character the weapon of the at least one opposing character according to the selected disarm scenario, taking by the primary character the weapon away from the least one opposing character according to the selected disarm scenario, and removing from contention the at least one opposing character by the primary character using the weapon according to the selected disarm scenario. It is to be understood that in step 406, contacting the game item of the at least opposing character by the primary character, the disarm scenario displayed may involve different combinations of the primary character moving toward and engaging the opposing character while at some point in time grabbing the weapon of the at least one opposing character. Thereafter, in the step 408 of transferring the game item from the at least one opposing character to the primary character, the primary character essentially takes away the weapon from the at least one opposing character.

During the disarm sequence as shown in FIGS. 3B–3E, a further embodiment may provide the player with the added functionality of switching between multiple camera angles to get alternate views of the action. Another embodiment may have multiple disarm sequences, such as 15 different disarm sequences. In such an embodiment each of the game's 15 disarms may have a custom set of camera positions and coordinates. Further, the player may view the disarm sequence in slow motion by pressing an assigned disarm button a second time, for example.

Through the game's menu system, the player can choose to have the program choose and playback the unlocked disarm sequences randomly or manually. If the player selects to have the program choose the disarm sequences randomly, the program will select camera speed and toggle positions automatically. If the player wants to manually initiate any unlocked disarm; the program can be set to "random off" allowing the player to call an unlocked disarm "on demand" by pressing the appropriate button assignment(s).

Another feature embodiment of the game system is the concept of providing a fetching character that is associated with the primary character. Although the fetching character may have a variety of different forms and appearances, in one embodiment the fetching character is a dog and the game system has programming such that the dog attacks opposing characters and fetches weapons from the opposing character and brings the weapons back to the primary character. In a fetching feature embodiment of the game system, the fetching character may be one of a plurality of weapons in a weapon inventory.

Figure 5A:
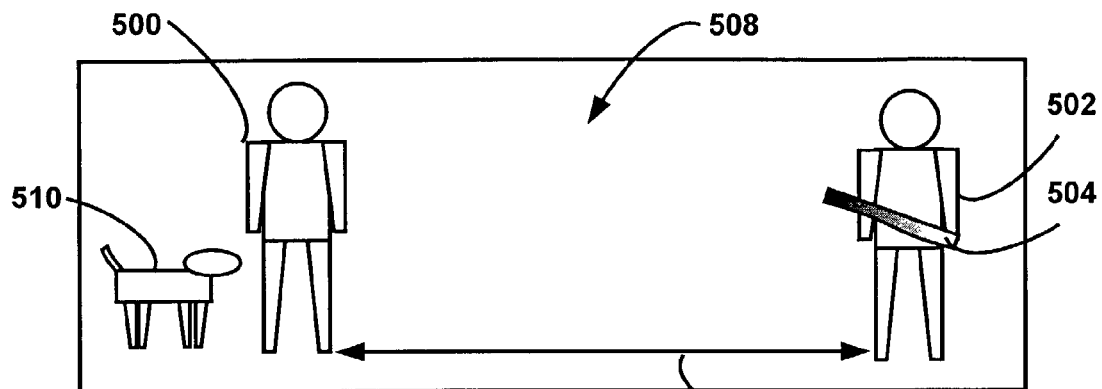
FIGS. 5A–5D depict image stages of sequence of actions in an embodiment of the game system.
Figure 5B:
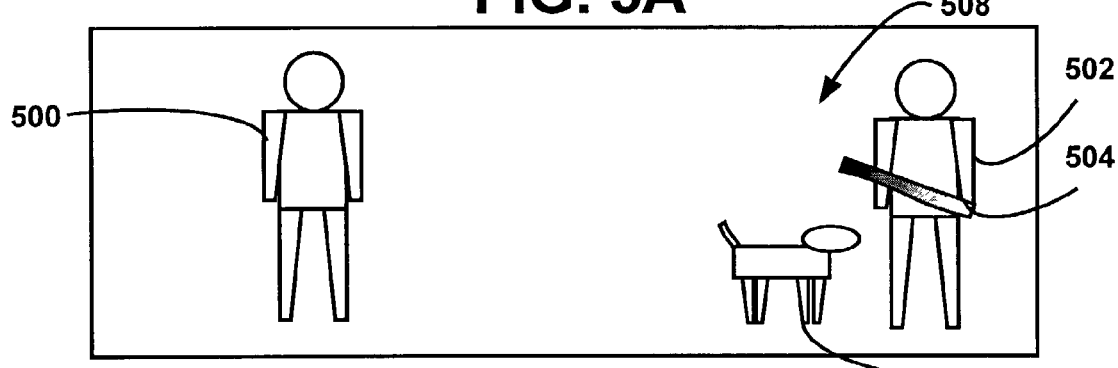
Figure 5C:
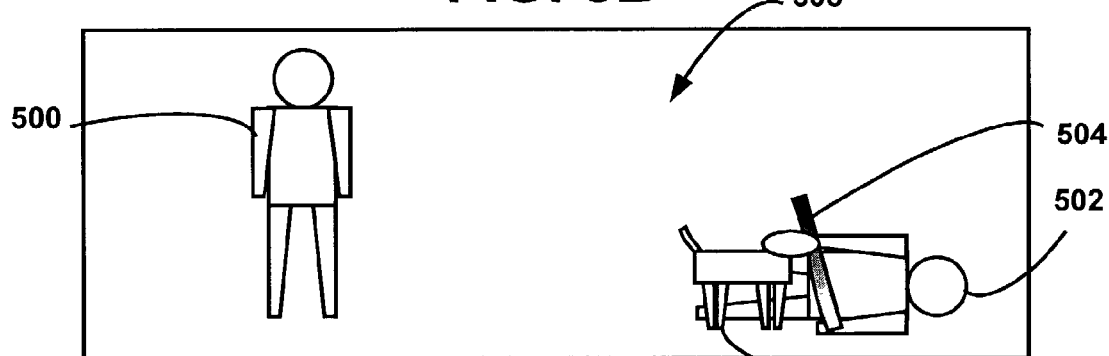
Figure 5D:
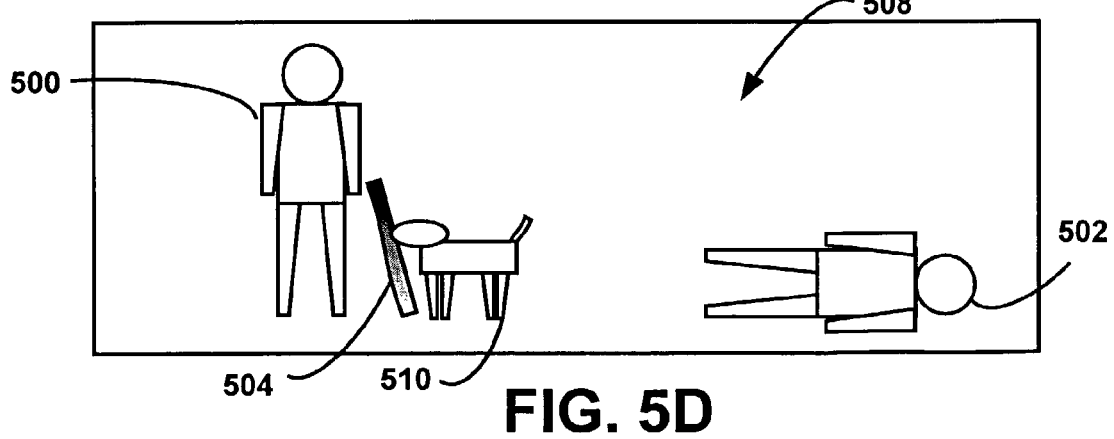
Figure 6:
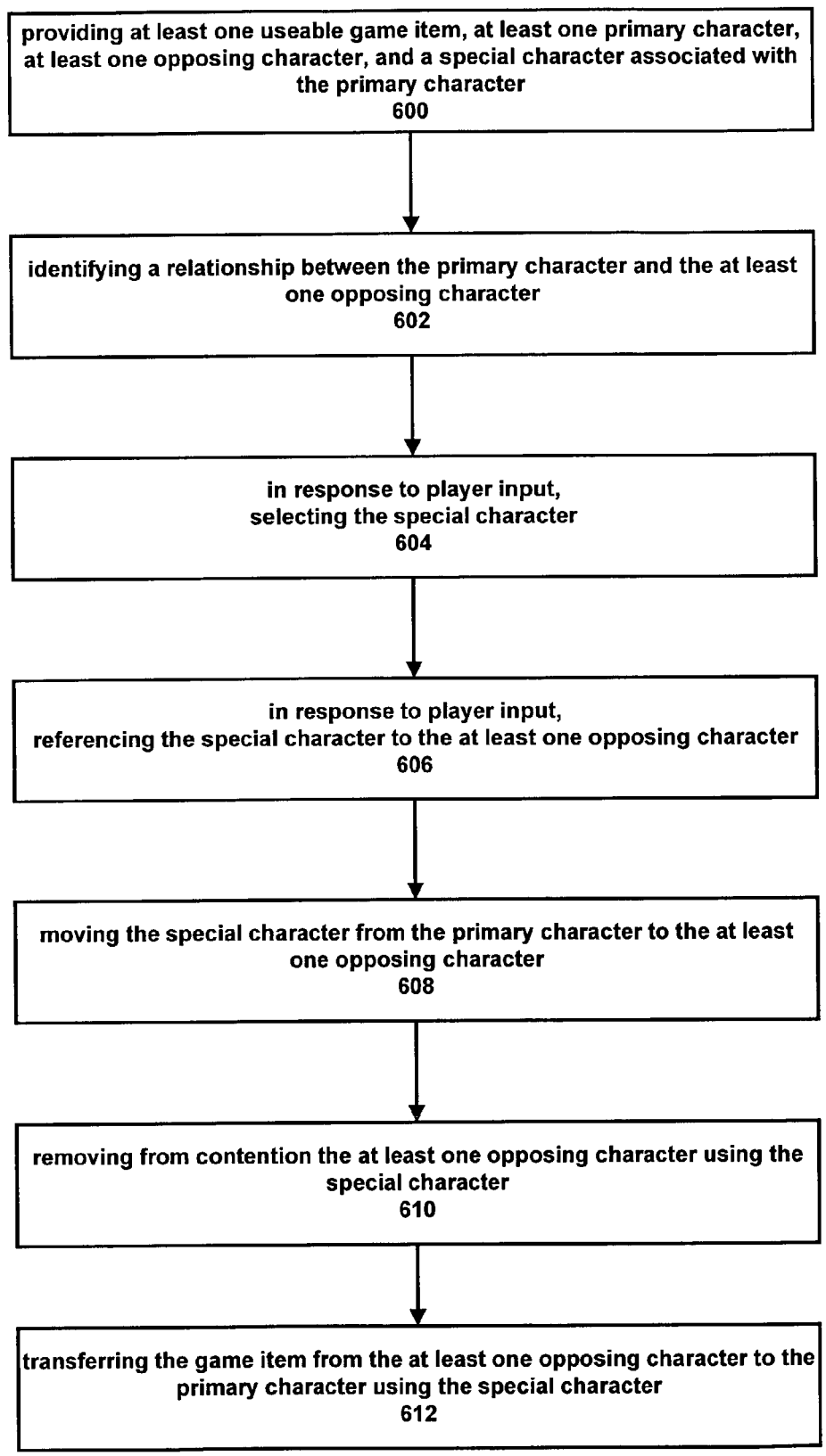
FIG. 6 is a flow diagram of the FIGS. 5A–5D embodiment.

FIGS. 5A–5D are pictures depicting the fetching feature embodiment of the game system. A flow diagram of the fetching feature embodiment is depicted in FIG. 6. In a first step 600, at least one useable game item, a primary character and at least one opposing character, is provided in a game space. A special character is provided and the special character is associated with the primary character. The special character may also referred to as a fetching character. As depicted in FIG. 5A, a primary character 500 has associated therewith a fetching character 510. An opposing character 502 is armed with a game item or weapon 504. All of this occurs in a game space 508. When the primary character 500 comes within a distance or area 506 of the opposing character 502, a relationship is identified between the primary character 500 and the opposing character 502. Upon player input, the fetching character 510 is selected and referenced to the opposing character 502. Upon further player input, the special or fetching character 510 moves to the at least one opposing character 502 as depicted in FIG. 5B. This occurs according to the fetching scenario, which in FIG. 5C continues with the fetching character 510 removing from contention the opposing character 502. In FIG. 5D, the fetching scenario continues with the fetching character 510 returning the game item, such as weapon 504, to the primary character 500. In a further embodiment, when an assigned button on a controller is pressed, to command the fetching character to "attack", an accompanying camera cut may be provided that shows the "attack event" in a close up view.

The steps of the method are depicted in the flow chart of FIG. 6. After the providing the game item, primary character, opposing character, and special character in step 600, the relationship between the primary character and the one opposing character is identified in step 602, that is, the primary character has moved within a predetermined area of the armed opposing character. In step 604, upon player input (such as pushing a button on a controller), the special character is selected. In step 606, upon further player input (such as by auto targeting), the special character is referenced to the at least one opposing character. In step 608, upon further player input (such as by pressing a firing button), the fetching scenario is activated and the special character is moved from the primary character to the opposing character, where the opposing character is removed from contention by the special character. The special character fetching the game item from the opposing character to the primary character then follows this.

Figure 7A:
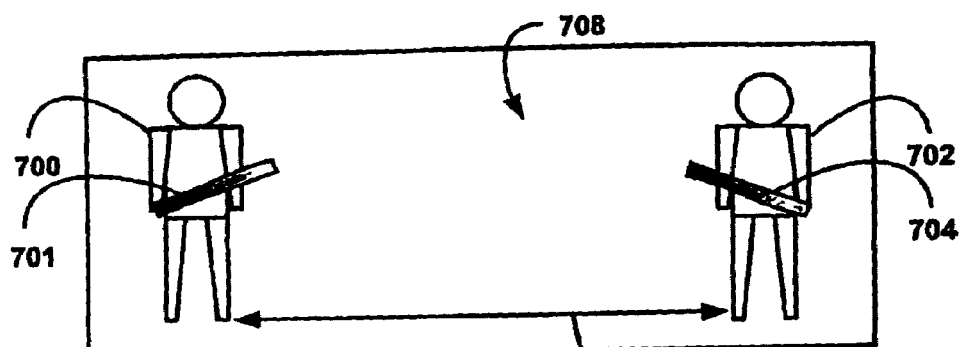
FIGS. 7A–7D depict image stages of sequence of actions in an embodiment of the game system.
Figure 7B:
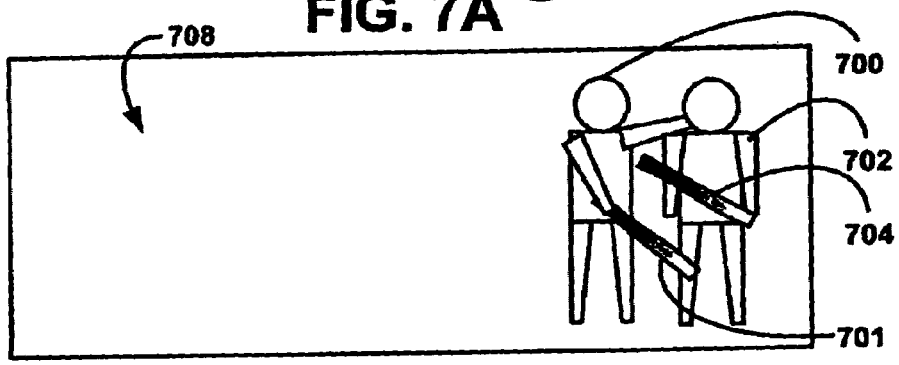
Figure 7C:
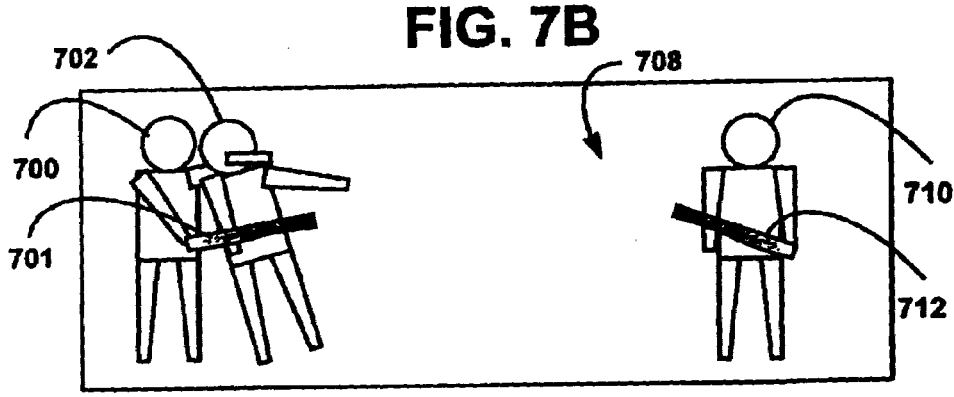
Figure 7D:
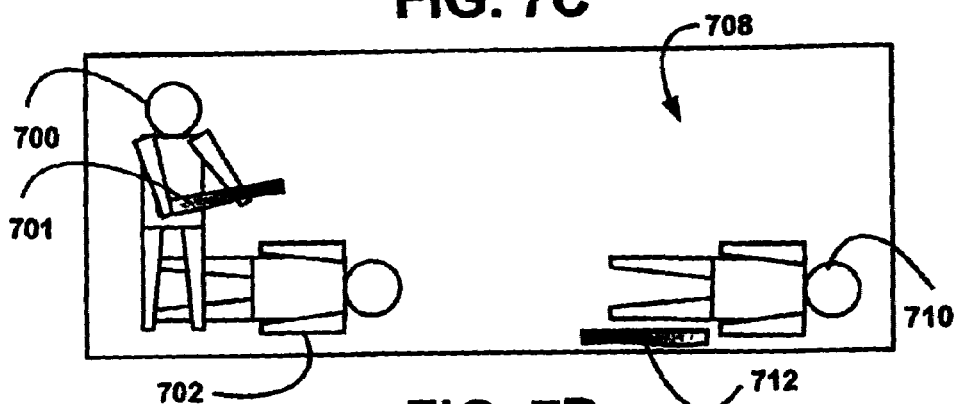
Figure 8:
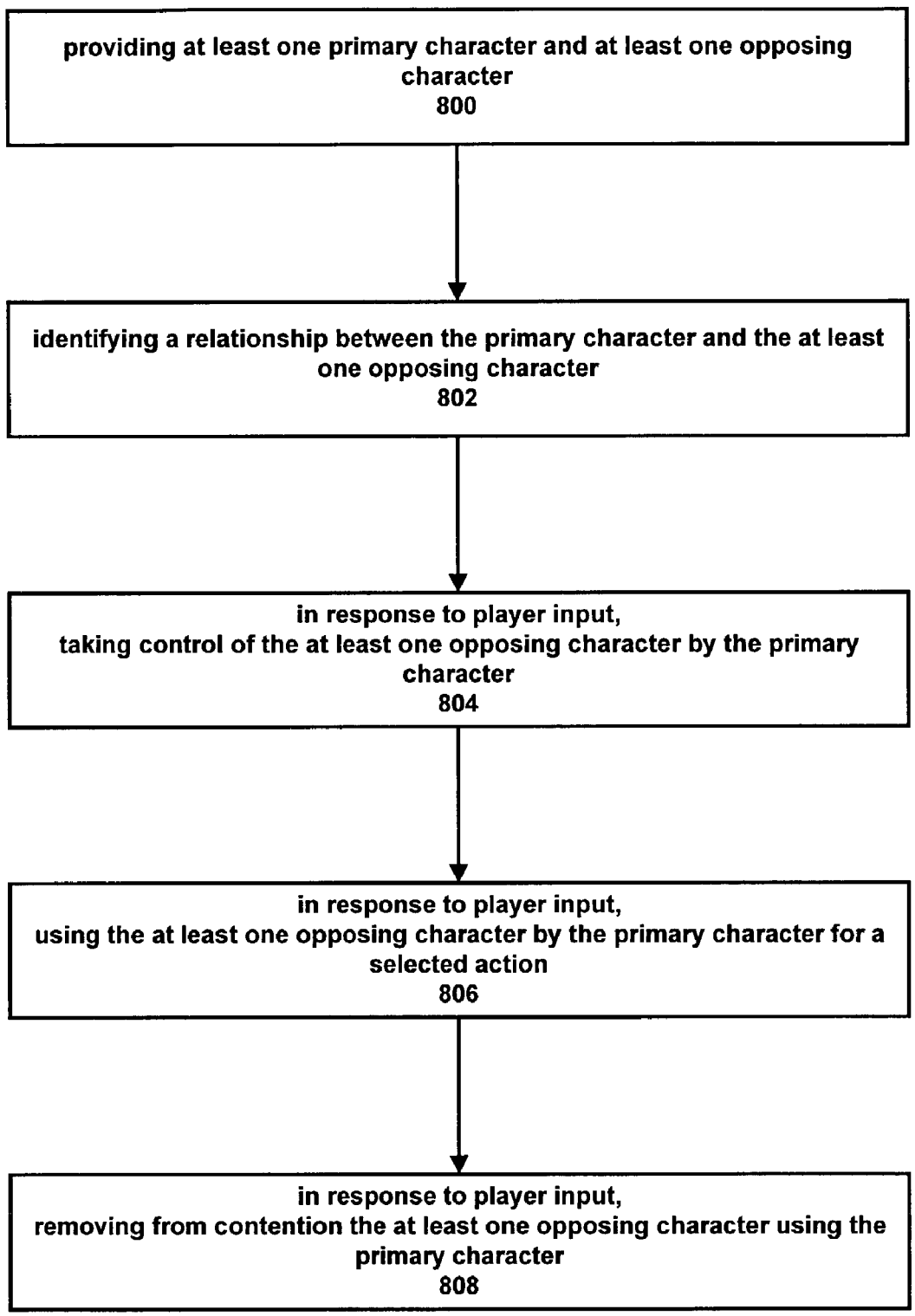
FIG. 8 is a flow diagram of the FIGS. 7A–7D embodiment.

A shield feature embodiment of the game system is depicted in FIGS. 7A–7D and a flow diagram of the method representative of this embodiment is depicted in FIG. 8. In this embodiment, an enemy is turned into a shield for the primary character. In embodiments of the game system, which include a primary character and an opposing character using weapons to shoot at one another, the user of a shield provides additional advantage to the primary character. In one embodiment, the shield has a shield meter, which diminishes as the shield takes hits from opposing characters. Once the meter is depleted, the shield may then be useless to the primary character. In one embodiment of the shield feature embodiment of the game system, the primary character when armed and in close proximity to an opposing character, can be activated by a player input (such as pressing a button) to grapple the opposing character into a frontal shield position. In this shield mode, the primary character is positioned behind the opposing character with his left arm wrapped around the opposing character's neck and his right arm free to fire his weapon. By player input (such as use of buttons or joystick), the joined primary character and opposing character are freely moveable and utilize a targeting system of the game system to eliminate or remove from contention further opposing characters in the game space. In a further embodiment, if there are no further enemies to fight, the primary character may remove contention the opposing character, which has formed the shield by pressing a button, for example.

As depicted in FIG. 7A, a primary character 700 has come within a predetermined distance or area 706 of an opposing character 702, which has a weapon 704. The opposing character 700 has a weapon 701. Upon user input, the primary character 700 moves to the opposing character 702 as depicted in FIG. 7B and then, as depicted in FIG. 7C, takes control of the opposing character 702 and holds the opposing character 702 substantially in front of the primary character 700. The primary character 700 holds the opposing character with its left arm 703 and uses its right arm 705 for firing a weapon 701. Also as depicted in FIG. 7C, a further opposing character 710 armed with a weapon 712 may be targeted by the primary character 700 while being protected from the further opposing character 710 by the opposing character 702 acting as a shield. Finally, as depicted in FIG. 7D, the primary character 700 has eliminated from contention both the first opposing character 702 and the further opposing character 710.

FIG. 8 is a flowchart of a method for implementing the shield feature embodiment. In a first step 800, at least a primary character and at least one opposing character are provided. In step 802, a relationship is identified between the primary character and the opposing character, for example, when the primary character moves within a predetermined area of the opposing character. Upon player input, the primary character takes control of the opposing character in step 804. Upon further player inputs, the primary character uses the opposing character for a selected action, such as a shield, in step 806. Finally, in step 808, the primary character may remove from contention the opposing character.

Figure 9A:
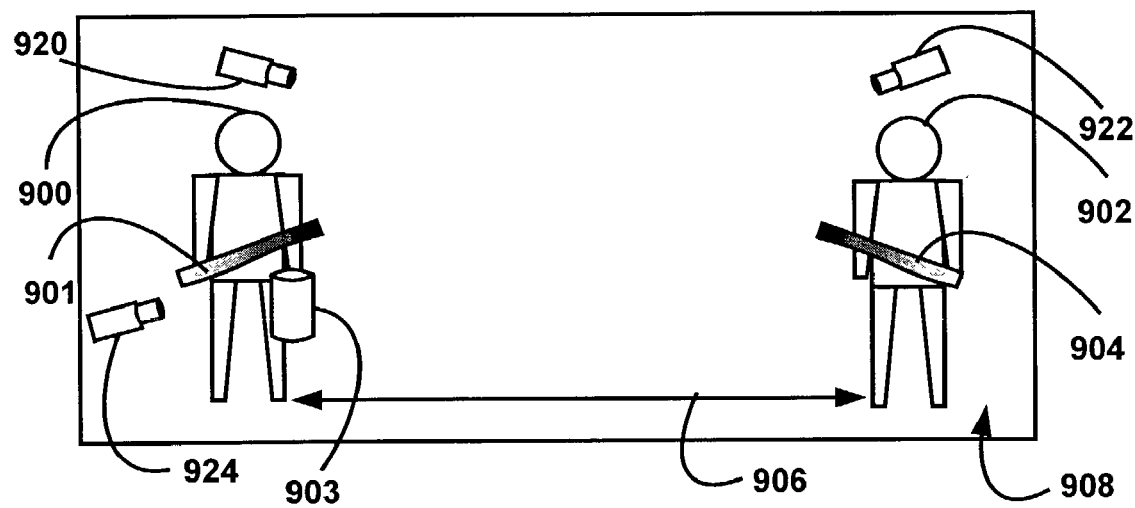
FIGS. 9A–9C depict image stages of sequence of actions in an embodiment of the game system.
Figure 9B:
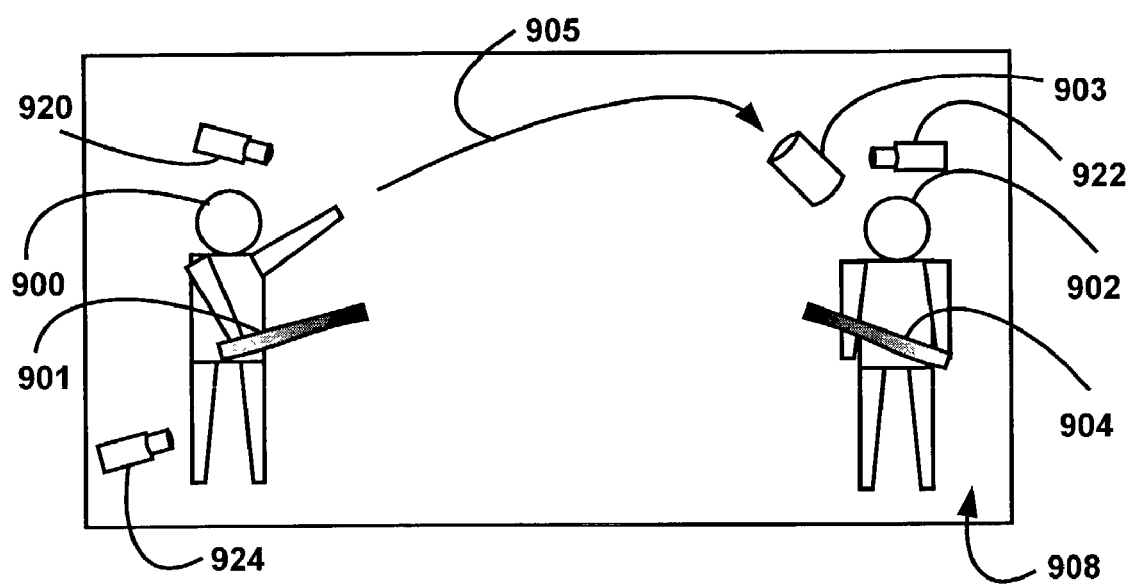
Figure 9C:
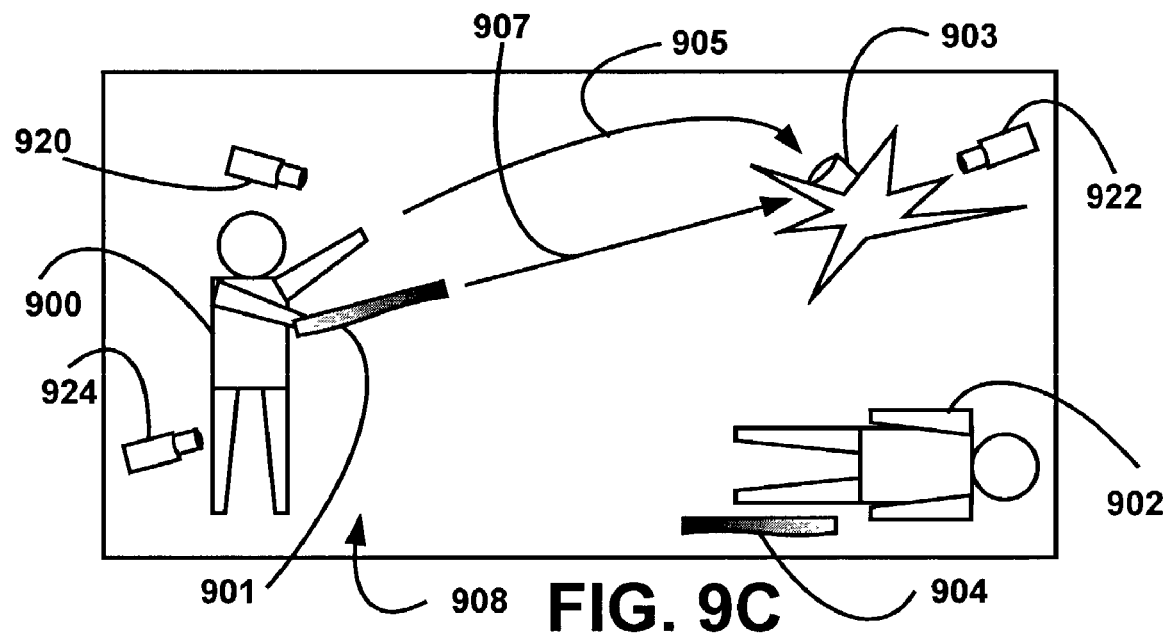
Figure 10:
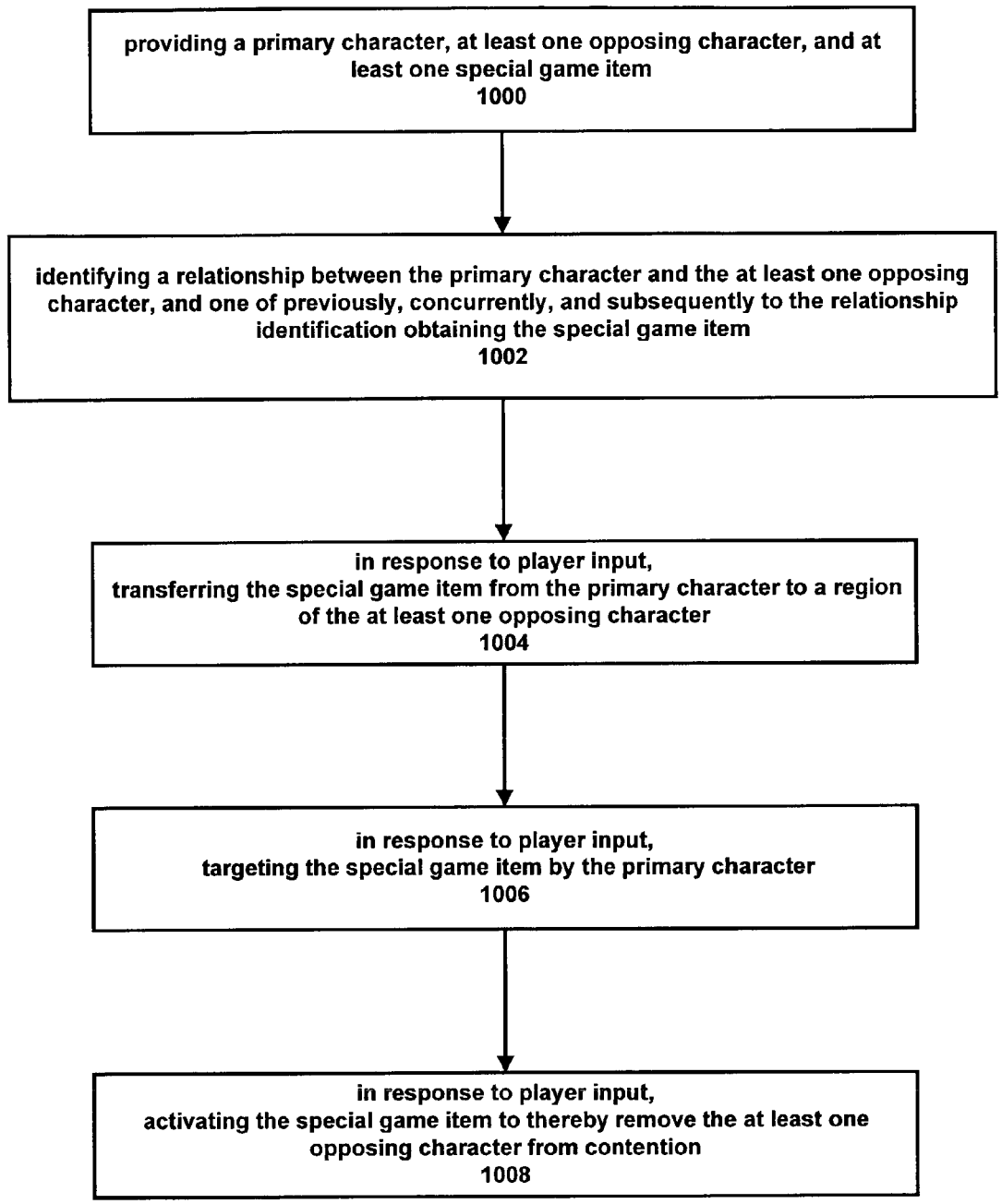
FIG. 10 is a flow diagram of the FIGS. 9A–9C embodiment.

A toss-and-shoot feature embodiment of the game system is depicted in FIG. 9, and in FIG. 10 a flowchart of the toss-and-shoot feature embodiment is set forth. The toss-and-shoot feature embodiment allows the player to collect an explodable item, such as flammable canister, in the virtual space, and hurl it at opposing characters (also objects) and fire upon the canister create an explosion. These explosions then destroy objects or remove from contention opposing characters. Upon player input (such as with buttons or a joystick), the primary character is steered until the primary character collides with a flammable canister (that is a collision detection routine in the game system identifies the movement and location of the primary character with a flammable canister location in the game space). In an embodiment, when the primary character is within a predetermined area of the flammable canister, the primary character automatically picks it up (the game system associates this special game item of a flammable canister with the primary character). Upon further user input (such as auto targeting), an opposing character in the virtual space is targeted and the primary character throws the canister though the air at the opposing character (for example, by user input of pressing a fire button). While in flight and with further player input (for example, while holding the auto target button), the flying canister may be targeted, highlighted, or selected, and then the primary character may shoot at the flying canister to create an explosion.

FIGS. 9A–9C depict the toss-and-shoot feature embodiment of the game system. In FIG. 9A, a primary character 900 has a weapon 901 and a flammable canister 903. The primary character 900 is within a predetermined distance or area 906 of an opposing character 902 who is armed, for example, with a weapon 904. All of this occurs within a game space or virtual space 908. Upon user input and as depicted in FIG. 9B, the primary character 900 tosses the flammable canister 903 through the air along a trajectory 905. The primary character 900 in FIG. 9C then shoots the flammable canister 903, for example, along trajectory 907 causing the canister 903 to explode, and thus remove from contention the opposing character 902. It is to be understood that other than, of course, firing a weapon, other means may be utilized for activating the flammable canister or other types of devices. As described in the flowchart of FIG. 10, a primary character, at least one opposing character and at least one game item (such as the flammable canister) are provided in a first step 1000. In step 1002, the relationship is identified between the primary character and the at least one opposing character. It is to be understood that the identifying of the relationship (that is the primary character 900 moving within a predetermined distance or area of the opposing character) may be previous to, concurrent with, or subsequent to the obtaining the special game item. In step 1004, the special game item is transferred from the primary character to a region of the at least one opposing character (for example, by having the primary character toss the canister into the air). In step 1006, upon player input, the primary character targets the special game item or canister. Finally, in step 1008, the special game item is activated to remove the at least one opposing character from contention. That is, for example, upon player input, the flying canister is shot by the primary character causing it to explode and thus remove from contention the at least one opposing character.

The steps of the above-described methods for each of the feature embodiments depicted in FIGS. 3A–3E, FIGS. 5A–5D, FIGS. 7A–7D, and FIGS. 9A–9C may be implemented by hardware means or software code segments in the game system.

In further embodiments of features of the game system, a plurality of cameras may be provided in the game space (see, for example, U.S. Pat. Nos. 6,388,667, 6,417,856, and 6,304,267). These cameras are means for viewing and in conjunction with a means for recording in the game system form selectable view points (depending upon user input) in the game space. For example, as depicted in FIGS. 9A–9C for the toss-and-shoot feature embodiment, a first camera 920 provides a point of view of the primary character 900, while a second camera 922 provides a point of view of the opposing character 902. There may also be further cameras such as camera 924 in the game or virtual space 908. The camera 924 provides a further additional viewpoint for observing actions between the primary character 900 and the opposing character 902. Thus, upon player input for selecting a view from one of the cameras 920, 922, 924, a user may first select the viewpoint from the camera 920 associated with the primary character 900 in FIG. 9A, and thereafter, switch to the camera 922 associated with the opposing character 902 in order to see the canister 903 fly through the air along projectory 905. It is a further embodiment of the various feature embodiments of the game system the player can select a speed of viewing and/or recording the features depicted above, which may be at a real-time speed of the game system or at a different speed, such as a slow-motion speed of action in the game play.

Thus, for example, as described above, the player can watch the action unfold from the point of view of the opposing character when the canister flies through the air and explodes in front of him in the toss-and-shoot feature embodiment. Also, for example, in the disarm feature embodiment, the player can view the action from the point of view of the opposing character as he is disarmed by the primary character. Also, the player may view the action from the point of view of the opposing character in the fetching feature embodiment wherein the opposing character can watch the dog of the primary character approach him and remove a weapon from him. Also, the player may view the action from the viewpoint of the opposing character in the shield feature embodiment wherein the primary character is seen approaching and then grabbing hold, followed by the opposing character seeing other opposing characters firing at him while he is used as a shield by the primary character.

Figure 11:
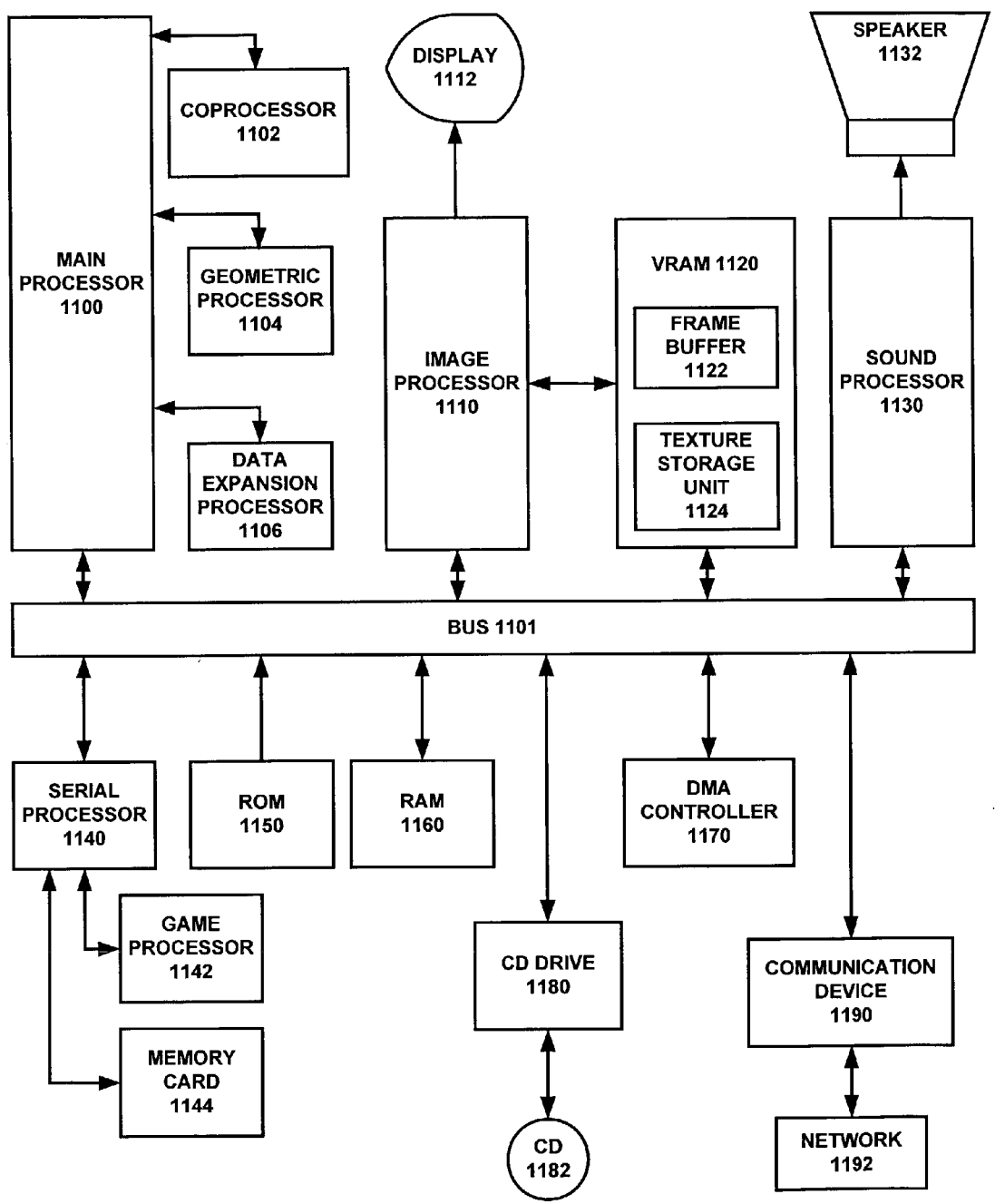
FIG. 11 is a block diagram of an embodiment of the game system.

FIG. 11 depicts one example of a hardware configuration that may be used to implement the embodiments of the game system. The main processor 1100 operates according to programs stored in CD 1182 (one type of information storage medium), programs which have been forwarded through communication interface device 1190, or programs stored in ROM 1150 (one type of information storage medium), and enacts various processes, such as game processing, image processing and sound processing.

Possessed of an integrator and an analog divider, which make high-speed parallel computation possible, the coprocessor 1102 performs high-speed matrix operations (vector operations). It assists in the processes of the main processor 1100. For example, programs that run on the main processor 1100 dispatch (entrust) to the coprocessor 1102 the performance of matrix or other operations necessary in the physical simulation of object movement or actions (motions).

Geometric processor 1101 executes such geometric processes as position changes, viewpoint changes, light source calculations, and curved surface calculations. Possessed of an integrator and an analog divider, which make high-speed parallel computation possible, it performs high-speed matrix operations (vector operations). Such processes as position changes, viewpoint changes and light source calculations are dispatched to the geometric processor 1104 by programs that run on the main processor 1100.

Data expansion processor 1106 accelerates the decoding processes of the main processor 1100 by performing the decoding functions of expansion of compressed image, sound or other data. It can then display on the opening screen, intermission screen, ending screen or the game screen itself moving images that had been compressed according to a prescribed image compression formula. The image and sound data that are the object of the decoding operations are stored in the ROM 1150 and the CD 1182, or they are received from an outside source through the communication interface device 1190.

The image processor 1110 executes at high speed processing of object imaging (renderings) which are composed of the basic facets of polygons and curved surfaces. In object imaging, the main processor 1100, using the DMA controller 1170, sends the object data to the image processor 1110, and, if it is necessary, it also transmits texture to the texture storage unit 1124. Once this is accomplished, based on said object data and texture, the image processor 1110, using such a unit as the Z buffer to perform shading, images the object on the frame buffer 1122 at high speed. Also, the image processor 1110 can perform such processes as alpha blending (opaquing), depth queuing, MIP mapping, fog processing, bilinear filtering, trilinear filtering, antialiasing, and shading. Finally, after one frame's worth of images is written in the frame buffer 1122, the images are displayed on the display 1112.

The sound processor 1130 integrates various channels of ADPCM sound and synthesizes high-definition game sounds including BGM, sound effects and voices. The synthesized game sounds are outputted through the speaker 1132.

Such data as operational data from the game controller 1142, and saved data and personal data from the memory card 1144 are transmitted through the serial interface device 1140.

The ROM 1150 stores the system program. In a commercial game system, the ROM 1150 can function as an information storage medium, and a range of programs can be stored there. Or, a hard disk can be used in place of the ROM 1150. The RAM 1160 is used as the workspace of all the processors. The DMA controller 1170 controls DMA transmission between processors and memory (such as RAM, VRAM, ROM).

The CD drive 1180 drives the CD 1182 (information storage medium) on which are stored programs, image data and sound data, and, in so doing, makes access to these programs and data possible.

The communication interface device 1190 facilitates network transmission of data between the bus 1101 and the network 1192. Possibilities for networks connected to the communication interface device 1190 may include a communication line (analog phone line or ISDN) or a high-speed serial signal path. With a communication line, data can be transmitted through the Internet. By using a high-speed serial signal path, transmission of data among any number of game systems would be possible.

It is to be understood, of course, that the present invention in various embodiments can be implemented in hardware, software, or in combinations of hardware and software.

Figures 12A, 12B:
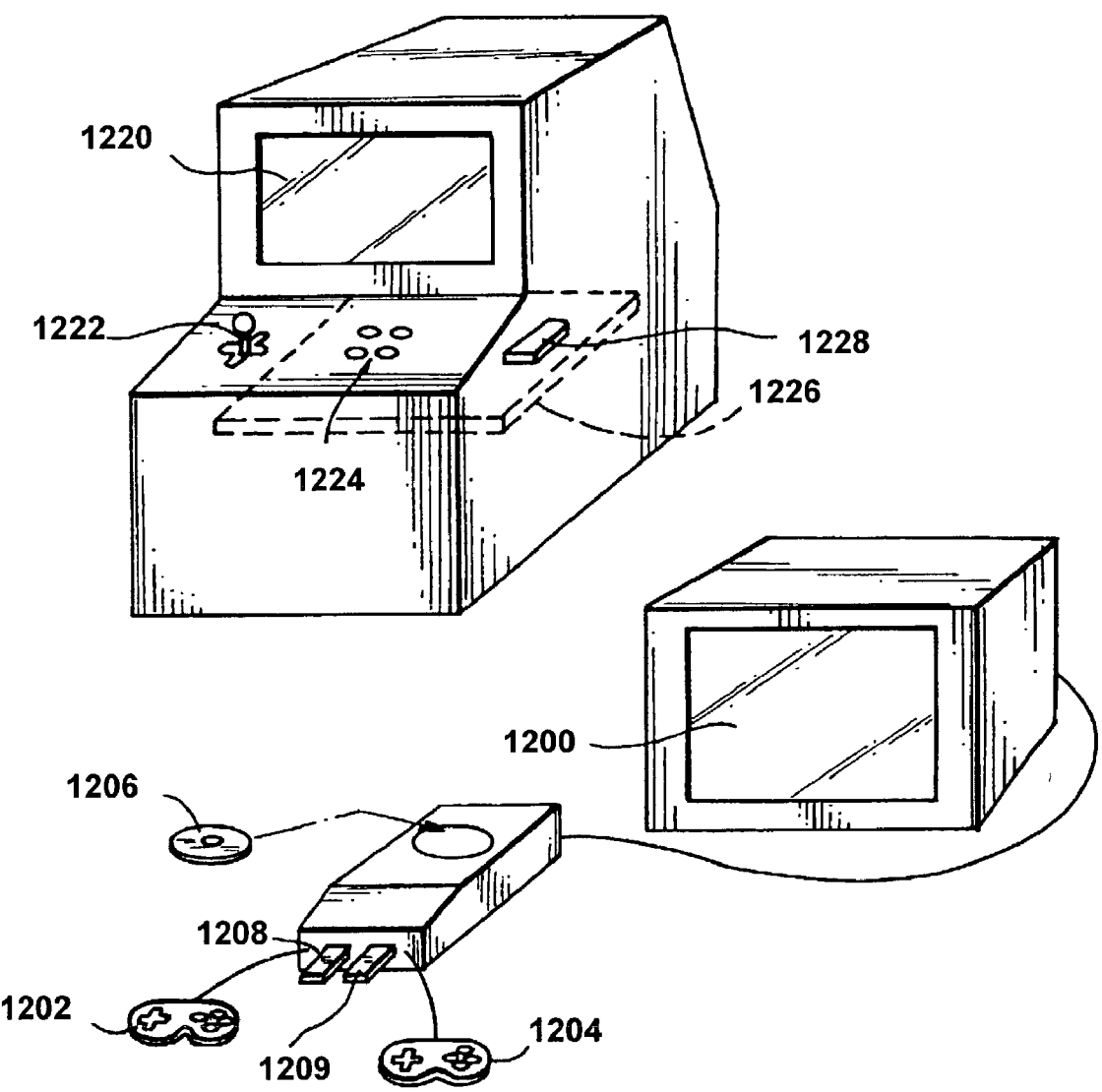
FIGS. 12A and 12B depict hardware environments for implementation of embodiments of the game system.

FIG. 12A is an illustration of a configuration of hardware for an embodiment applicable to a commercial game system. The player plays the game by operating devices such as lever 1222 and button 1224, while looking at the game images projected on the display. On the embedded system board (circuit board) 1226 are mounted various processors and memory. Information (programs and data) necessary to execute the embodiments of the game system is stored in memory 1228, the information storage medium on the system board 1226.

FIG. 12B is an illustration of a configuration of an embodiment applicable to home use. The player plays the game by operating the game controllers 1202 and 1204, while looking at the game images projected on the display. In this case, the above-described stored information is stored in an insertable information storage medium, such as CD 1206 or memory cards 1208 and 1209. This computer readable media may also be any suitable storage medium including not nor limited to semiconductor RAM, ROM or flash memory, CD's, DVD's, paper tape, punch cards, and any optical, magnetic, and semiconductor recording mediums or the like.

Figure 13:
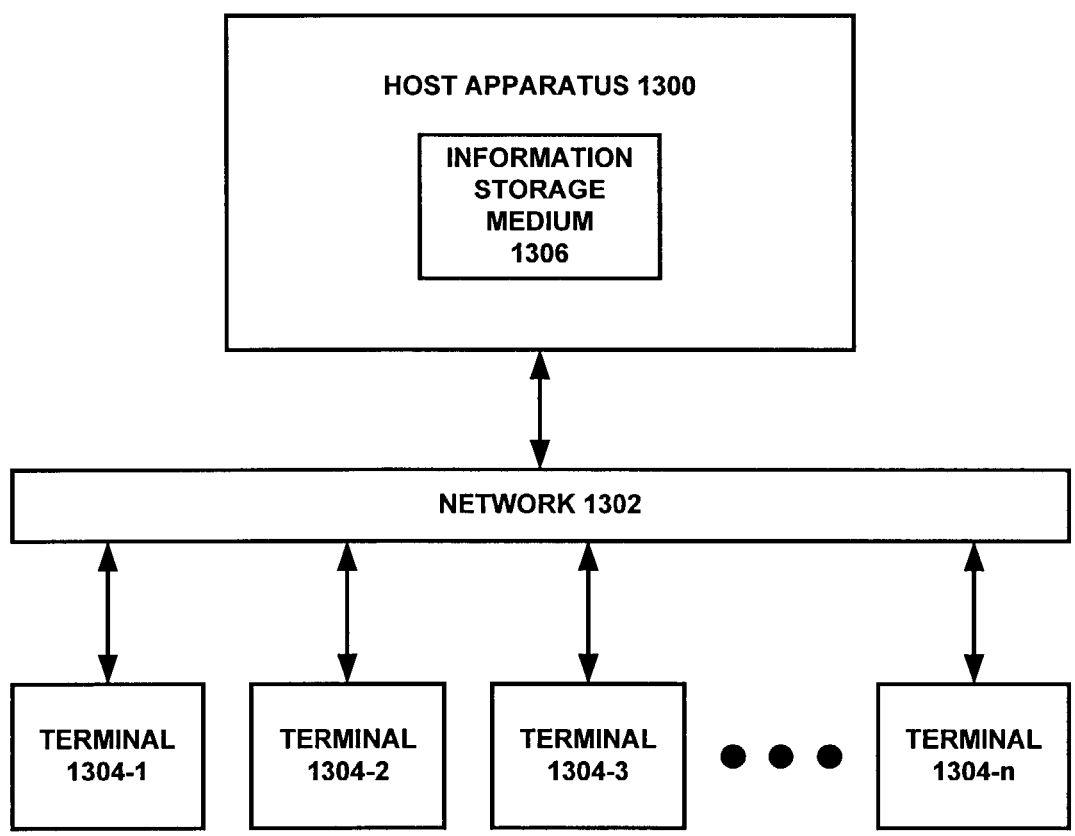
FIG. 13 is a block diagram of a network implementation for use with embodiments of the game system.

FIG. 13 illustrates a configuration of an embodiment applicable to a system which has a host apparatus 1300 and terminals 1304-1 through 1304-n, connected to the host apparatus 1300 through a network 1302 (for example, small-area networks, wide-area networks, the Internet, etc.). In this case, the above-described stored information is stored in information storage medium 1306, which may be for example a magnetic disk, magnetic tape, memory controllable, etc., by the host apparatus 1300. In the case of the terminals 1304-1 through 1304-n being stand-alone, and capable of generating game images and game sounds, game programs to generate game images and game sounds are sent to the terminals 1304-1 through 1304-n from the host apparatus 1300. When the terminals 1304-1 through 1304-n cannot synthesize images or sound on their own, the host apparatus 1300 generates the game images and game sounds, and transmits these to the terminals 1304-1 through 1304-n, where the images and sounds are outputted.

In the case of the configuration illustrated in FIG. 13, the various embodiments of the game system may be executed jointly in a divided manner by both host apparatus (server) and terminals. Also, the above-described stored information used to execute the various embodiments of the game system may be stored jointly in a divided manner on both the information storage medium of the host apparatus (server) and the information storage unit of the terminals.

Also, terminals connected to a network may be components of either home-based game systems or commercial game systems. When connecting a commercial game system to the network, it would be most desirable to utilize savable information storage media (memory cards, portable game units) that allow for exchange of information among not only commercial game systems but home-based game systems as well.

In general, one embodiment of the game system is a computer game apparatus for executing a game in which at least one primary character and at least one opposing character move through virtual space displayed on a predetermined display by operation of an operating unit. A memory stores at least a game program, the game program having code modules for implementing predetermined actions, each of the code modules implementing a respective predetermined action for at least; identifying a relationship between the primary character and the at least one opposing character, at least interfacing the primary character with the at least one opposing character, performing the respective predetermined action relative to the at least one opposing character, and removing the at least one opposing character from contention. A controller executes the game program and controls the movements of the at least one primary character and the at least one opposing character according to the game program.

For implementation of a feature embodiment, such as a toss-and-shoot embodiment, the game program contains embedded computer program code 1400 (see FIG. 14) for controlling the movements of the at least one primary character and at least one opposing character according to the game program, the computer readable media containing computer program code segments having: a first computer program code segment 1402 that provides at least one special game item; a second computer program code segment 1404 that identifies a relationship between the primary character and the at least one opposing character, and one of previously, concurrently, and subsequently to the relationship identification obtaining the special game item; a third computer program code segment 1406 that effects transferring the special game item from the primary character to a region of the at least one opposing character; a fourth computer program code segment 1408 that effects targeting the special game item by the primary character; and a fifth computer program code segment 1410 that effects activating the special game item to thereby remove the at least one opposing character from contention.

For implementation of a feature embodiment, such as a shield embodiment, the game program contains embedded computer program code 1500 (see FIG. 15) for controlling the movements of the at least one primary character and at least one opposing character according to the game program, the computer readable media containing computer program code segments having: a first computer program code segment 1502 that identifies a relationship between the primary character and the at least one opposing character; a second computer program code segment 1504 that effects taking control of the at least one opposing character by the primary character; a third computer program code segment 1506 that effects using the at least one opposing character by the primary character for a selected action; and a fourth computer program code segment 1508 that effects removing from contention the at least one opposing character using the primary character.

For implementation of a feature embodiment, such as a fetching embodiment, the game program contains embedded computer program code 1600 (see FIG. 16) for controlling the movements of the at least one primary character and at least one opposing character according to the game program, the computer readable media containing computer program code segments having: a first computer program code segment 1602 that provides a special character associated with the primary character; a second computer program code segment 1604 that identifies a relationship between the primary character and the at least one opposing character; a third computer program code segment 1606 that selects the special character; a fourth computer program code segment 1608 that references the special character to the at least one opposing character; a fifth computer program code segment 1610 that effects moving the special character from the primary character to the at least one opposing character; a sixth computer program code segment 1612 that effects removing from contention the at least one opposing character using the special character; and a seventh computer program code segment 1614 that effects transferring the game item from the at least one opposing character to the primary character using the special character.

For implementation of a feature embodiment, such as a disarm embodiment, the game program contains embedded computer program code 1700 (see FIG. 17) for controlling the movements of the at least one primary character and at least one opposing character according to the game program, the computer readable media containing computer program code segments having: a first computer program code segment 1702 that provides a plurality of predetermined scenarios; a second computer program code 1704 segment that identifies a relationship between the primary character and the at least one opposing character; a third computer program code segment 1706 that selects one scenario of the plurality of predetermined scenarios; a fourth computer program code 1708 segment that effects contacting the game item of the at least one opposing character by the primary character according to the selected scenario; a fifth computer program code segment 1710 that effects transferring the game item from the at least one opposing character to the primary character according to the selected scenario; and a sixth computer program code segment 1712 that effects removing from contention the at least one opposing character using the game item according to the selected scenario.

The following is an example of use of the above-described features in a computer game according to an embodiment of the game system wherein the game system includes a controller having at least buttons. Such an embodiment of the game system may be implemented in a system such as depicted in FIG. 12B where the system is capable of processing, interactively in real time, a digital representation or model of a three-dimensional world. The system can display some or the entire world from any arbitrary viewpoint. For example, the system can interactively change the viewpoint in response to real time inputs from handheld controllers 1202, 1204 or other input devices. This allows the game player to see the world through the eyes of someone within or outside of the world.

One feature is the shield feature, one example being depicted in FIG. 7. When armed and in close proximity to an enemy character, the player can press an Action Button to grapple the enemy into a frontal "shield" position. In this Shield mode, the primary character is positioned behind the enemy character with his left arm wrapped around the enemy's neck and his right arm free to fire his weapon(s). The player can move the adjoined primary character and enemy character freely in this mode and can use the game's targeting systems to eliminate other enemies. If there are no further enemies to fight, the primary character can remove from contention the enemy character with a second press of the Action Button.

Another feature is the disarm feature, one example being depicted in FIG. 3. When the primary character is unarmed and in close proximity to an enemy character, the player can press the Action Button to perform a Disarm Move. Disarm Moves involve the primary character stealing a weapon away from the enemy character and using it or a physical attack against the enemy character. During a Disarm Move, the player can initiate slow motion playback by pressing the same Action Button a second time. Further, the player can toggle between custom camera angles for each Disarm Move by pressing the appropriate camera button.

Disarm Moves may be "unlockable" over the course of the game. By performing these exciting moves, the player unlocks more of them. The player can select to have the program randomly use Disarm Moves that have been unlocked or they can be called on demand, by pressing an appropriate Left Analog Stick direction and the Action Button at the same time.

Another feature is the toss-and-shoot feature, one example being depicted in FIG. 9. The Toss-n-Shoot feature allows the player to have the primary character collect a flammable canister in the environment, hurl it at enemies/objects and fire upon it in flight to create devastating explosions. When the player steers the primary character and he collides with a flammable canister, he will automatically pick it up. Once in hand, the player can Auto Target an enemy character in the environment and throw the canister at this enemy character by pressing the Fire Button. While in flight, the player can hold the Auto Target Button again to highlight the flying canister, and then shoot at it at the desired moment to create a deadly explosion. During the Toss-n-Shoot sequence, the player can press the appropriate camera button to see the hurled canister from the enemy's point of view.

Another feature is the fetching feature, one example being depicted in FIG. 5. The primary character may have a K9 unit partner. The player can command the K9 unit partner to attack an enemy character by holding the Auto Targeting Button followed by pressing the Fire Button. When this happens, the K9 unit partner will leap and remove from contention the targeted enemy character and return the weapon of the enemy character to the primary character.

The present invention is applicable to a variety of games (inclusive of combat games, shooting games, enemy robot games, sports games, competitions, role-playing games, musical games, and dance games). The present invention is also not limited to the domestic and arcade game machines, but may similarly be applied to an image generation device used in various other apparatuses such as simulators, large-scale and multi-player attraction systems, personal computers, multimedia terminals, system boards for generating game images, etc.

Moreover, the present invention is applicable to a variety of game systems, including commercial game systems, home-based game systems, large-scale multi-player entertainment systems, simulators, multi-media terminals, and system boards that generate game images.

Thus, the present invention provides a game system that immerses the player into the storyline and characters similar to the way movies do, and that provides a different type of action-adventure genre with new and exciting features.

The present invention is not limited to the particular details of the apparatus depicted, and other applications are contemplated. Certain other changes may be made in the above-described apparatus without departing from the true spirit and scope of the invention herein involved. It is intended, therefore, that the subject matter in the above depiction shall be interpreted as illustrative and not in a limiting sense.

What is claimed is:

1. A method for effecting character interplay in a computer game having at least one useable game item, having a primary character and at least one opposing character, comprising the steps of:

providing a plurality of predetermined scenarios;

identifying a relationship between the primary character and the at least one opposing character;

selecting one scenario of the plurality of predetermined scenarios;

contacting the game item of the at least one opposing character by the primary character according to the selected scenario;

transferring the game item from the at least one opposing character to the primary character according to the selected scenario; and removing from contention the at least one opposing character using the game item according to the selected scenario.

2. A method for effecting character interplay in a computer game having at least one useable game item, having a primary character and at least one opposing character, comprising the steps of:

providing a special character associated with the primary character;

identifying a relationship between the primary character and the at least one opposing character;

selecting the special character;

referencing the special character to the at least one opposing character;

moving the special character from the primary character to the at least one opposing character;

removing from contention the at least one opposing character using the special character; and transferring the game item from the at least one opposing character to the primary character using the special character.

3. A method for effecting character interplay in a computer game having a primary character and at least one opposing character, comprising the steps of:

providing at least one special game item;

identifying a relationship between the primary character and the at least one opposing character, and one of previously, concurrently, and subsequently to the relationship identification obtaining the special game item;

transferring the special game item from the primary character to a region of the at least one opposing character;

targeting the special game item by the primary character; and activating the special game item to thereby remove the at least one opposing character from contention.

4. A method for effecting character interplay in a computer game having at least one weapon, having a primary character and at least one opposing character in a game space, comprising the steps of:

providing a plurality of predetermined disarm scenarios;

targeting by the primary character the at least one opposing character;

selecting one disarm scenario of the plurality of predetermined disarm scenarios;

grabbing by the primary character the weapon of the at least one opposing character according to the selected disarm scenario;

taking by the primary character the weapon away from the at least one opposing character according to the selected disarm scenario; and removing from contention the at least one opposing character by the primary character using the weapon according to the selected disarm scenario.

5. A method for effecting character interplay in a computer game having at least one weapon, having a primary character and at least one opposing character in a game space, comprising the steps of:

providing a fetching character associated with the primary character;

targeting by the primary character the at least one opposing character;

selecting the fetching character;

moving the fetching character from the primary character to the at least one opposing character;

removing from contention the at least one opposing character using the fetching character; and fetching the weapon by the fetching character thereby transferring the weapon from the at least one opposing character to the primary character.

6. A method for effecting character interplay in a computer game having a primary character and at least one opposing character in a game space, comprising the steps of:

targeting by the primary character the at least one opposing character;

taking control of the at least one opposing character by the primary character and holding the at least one opposing character substantially in front of the primary character;

using the at least one opposing character as a shield by the primary character; and removing from contention the at least one opposing character used by the primary character when the primary character is finished using the at least one opposing character as a shield.

7. A method for effecting character interplay in a computer game having a primary character and at least one opposing character in a game space, comprising the steps of:

providing at least one explodable item;

targeting by the primary character the at least one opposing character, and one of previously, concurrently, and subsequently to the targeting obtaining the at least one explodable item;

throwing the explodable item by the primary character to a region of the at least one opposing character;

targeting, while the explodable item is in the region of the at least one opposing character, the explodable item by the primary character; and exploding, while the explodable item is in the region of the at least one opposing character, the explodable item to thereby remove the at least one opposing character from contention.

8. The method according to claim 7, wherein the explodable item is thrown through the air, and wherein the method further comprises targeting and exploding the explodable item while the expoldable item is still in the air.

9. A computer game apparatus for executing a game in which at least one primary character and at least one opposing character move through virtual space displayed on a display unit by operation of an operating unit, comprising:

computer readable media for storing at least a game program; and a controller for executing the game program and controlling the movements of the at least one primary character and the at least one opposing character according to the game program;

wherein the game program contains embedded computer program code for controlling the movements of the at least one primary character and at least one opposing character according to the game program, the computer readable media containing computer program code segments comprising:

a first computer program code segment that provides a plurality of predetermined scenarios;

a second computer program code segment that identifies a relationship between the primary character and the at least one opposing character;

a third computer program code segment that selects one scenario of the plurality of predetermined scenarios;

a fourth computer program code segment that effects contacting a game item of the at least one opposing character by the primary character according to the selected scenario;

a fifth computer program code segment that effects transferring the game item from the at least one opposing character to the primary character according to the selected scenario; and a sixth computer program code segment that effects removing from contention the at least one opposing character using the game item according to the selected scenarios.

10. A computer game apparatus for executing a game in which at least one primary character and at least one opposing character move through virtual space displayed on a display unit by operation of an operating unit, comprising:

computer readable media for storing at least a game program; and a controller for executing the game program and controlling the movements of the at least one primary character and the at least one opposing character according to the game program;

wherein the game program contains embedded computer program code for controlling the movements of the at least one primary character and at least one opposing character according to the game program, the computer readable media containing computer program code segments comprising:

a first computer program code segment that provides a special character associated with the primary character;

a second computer program code segment that identifies a relationship between the primary character and the at least one opposing character;

a third computer program code segment that selects the special character;

a fourth computer program code segment that references the special character to the at least one opposing character;

a fifth computer program code segment that effects moving the special character from the primary character to the at least one opposing character;

a sixth computer program code segment that effects removing from contention the at least one opposing character using the special character; and a seventh computer program code segment that effects transferring the game item from the at least one opposing character to the primary character using the special character.

11. A computer game apparatus for executing a game in which at least one primary character and at least one opposing character move through virtual space displayed on a display unit by operation of an operating unit, comprising:

computer readable media for storing at least a game program; and a controller for executing the game program and controlling the movements of the at least one primary character and the at least one opposing character according to the game program;

wherein the game program contains embedded computer program code for controlling the movements of the at least one primary character and at least one opposing character according to the game program, the computer readable media containing computer program code segments comprising:

a first computer program code segment that provides at least one special game item;

a second computer program code segment that identifies a relationship between the primary character and the at least one opposing character, and one of previously, concurrently, and subsequently to the relationship identification obtaining the special game item;

a third computer program code segment that effects transferring the special game item from the primary character to a region of the at least one opposing character;

a fourth computer program code segment that effects targeting the special game item by the primary character; and a fifth computer program code segment that effects activating the special game item to thereby remove the at least one opposing character from contention.

12. A game system that allows player input in the generation of images on a display, comprising:

means for inputting player inputs;

means for providing at least one disarm scenario;

means for detecting an opposing character in a predetermined region relative to an unarmed primary character in a virtual space;

means for running a predetermined disarm scenario between the primary character and the opposing character in response to a player selection of the predetermined disarm scenario; and means for forming images on a display according to the predetermined disarm scenarios.

13. The game system according to claim 12, wherein the game system further comprises means for recording the running of the disarm scenario, and means for playing back the recorded disarm scenario in at least one of a same speed and a different speed than a speed of the recorded disarm scenario.

14. The game system according to claim 12, wherein the game system further comprises means for at least one of viewing and recording the running of the disarm scenario from at least one of a plurality of cameras, each of which having a respective camera angle and camera speed.

15. The game system according to claim 12, wherein the game system further comprises means for at least one of viewing and recording the running of the disarm scenario from a camera having a camera angle representative of a view by the opposing character.

16. The game system according to claim 12, wherein the game system further comprises a plurality of selectable disarm scenarios.

17. A game system that allows player input in the generation of images on a display, comprising:

means for inputting player inputs;

means for detecting an opposing character in a predetermined region relative to a primary character in a virtual space;

means for providing a fetching character for the primary character in response to a player input;

means for running a predetermined fetch scenario between the fetching character and the opposing character in response to a player selection of the predetermined fetch scenario; and means for forming images on a display according to the predetermined fetch scenario.

18. The game system according to claim 17, wherein the game system further comprises means for recording the running of the fetch scenario, and means for playing back the recorded fetch scenario in at least one of a same speed and a different speed than a speed of the recorded fetch scenario.

19. The game system according to claim 17, wherein the game system further comprises means for at least one of viewing and recording the running of the fetch scenario from at least one of a plurality of cameras, each of which having a respective camera angle and camera speed.

20. The game system according to claim 17, wherein the game system further comprises means for at least one of viewing and recording the running of the fetch scenario from a camera having a camera angle representative of a view by the opposing character.

21. The game system according to claim 17, wherein the game system further comprises a plurality of selectable fetch scenarios.

22. A game system that allows player input in the generation of images on a display, comprising:
    means for inputting player inputs;
    means for detecting an opposing character in a predetermined region relative to an armed primary character in a virtual space;
    means for adjoining the primary character and the opposing character in response to a player selection of a shield mode;
    means for using the opposing character as a shield for the primary character from further opposing characters while in the shield mode;
    means for moving the adjoined opposing character and primary character in response to player inputs while in the shield mode;
    means for terminating the shield mode by one of a further player input and at least one predetermine game condition; and
    means for forming images on a display according to the shield mode.

23. The game system according to claim 22, wherein the game system further comprises means for recording game play while in the shield mode, and means for playing back the recorded game play in at least one of a same speed and a different speed than a speed of the recorded game play.

24. The game system according to claim 22, wherein the game system further comprises means for at least one of viewing and recording game play while in the shield mode from at least one of a plurality of cameras, each of which having a respective camera angle and camera speed.

25. The game system according to claim 22, wherein the game system further comprises means for at least one of viewing and recording the game play while in the shield mode from a camera having a camera angle representative of a view by the opposing character.

26. A game system that allows player input in the generation of images on a display, comprising:
    means for inputting player inputs;
    means for providing an explodable game item to a primary character in response to player inputs;
    means for detecting at least one opposing character in a predetermined region relative to the primary character in a virtual space;
    means for tossing the explodable item from the primary character through the air to an area of the at least one opposing character in response to a player first input;
    means for targeting and shooting by the primary character the explodable item, while the explodable item is in the air and in the area of the at least one opposing character, in response to second player inputs;
    means for executing collision detection in response to the targeting and shooting of the explodable item;
    means for exploding the explodable item and removing from contention the at least one opposing character; and
    means for forming images on a display for depicting obtaining the explodable item, detecting the at least one opposing character, tossing the explodable item, targeting and shooting the explodable item, and exploding the explodable item and removing from contention the at least one opposing character.

27. The game system according to claim 26, wherein the game system further comprises means for recording the formed images, and means for playing back the recorded formed images in at least one of a same speed and a different speed than a speed of the recorded formed images.

28. The game system according to claim 26, wherein the game system further comprises means for at least one of viewing and recording the formed images from at least one of a plurality of cameras, each of which having a respective camera angle and camera speed.

29. The game system according to claim 26, wherein the game system further comprises means for at least one of viewing and recording the formed images from a camera having a camera angle representative of a view by the opposing character.

* * * * *

UNITED STATES PATENT AND TRADEMARK OFFICE
CERTIFICATE OF CORRECTION

PATENT NO. : 7,126,607 B2
APPLICATION NO. : 10/223906
DATED : October 24, 2006
INVENTOR(S) : Andre Emerson Page 1 of 1

It is certified that error appears in the above-identified patent and that said Letters Patent is hereby corrected as shown below:

In claim 12 (column 18, line 30), delete "scenarios", and insert therefor --scenario--.

Signed and Sealed this

Second Day of January, 2007

JON W. DUDAS
*Director of the United States Patent and Trademark Office*